(12) United States Patent
Ono et al.

(10) Patent No.: US 7,180,533 B2
(45) Date of Patent: Feb. 20, 2007

(54) IMAGE PROCESSING APPARATUS, IMAGE PROCESSING METHOD, AND PROGRAM

(75) Inventors: Youichi Ono, Akiruno (JP); Masaya Shimoji, Hachioji (JP)

(73) Assignee: Konica Minolta Holdings Inc., Tokyo (JP)

( * ) Notice: Subject to any disclaimer, the term of this patent is extended or adjusted under 35 U.S.C. 154(b) by 270 days.

(21) Appl. No.: 10/734,894

(22) Filed: Dec. 12, 2003

(65) Prior Publication Data

US 2004/0125200 A1 Jul. 1, 2004

(30) Foreign Application Priority Data

Dec. 20, 2002 (JP) ............................. 2002-371076
Feb. 7, 2003 (JP) ............................. 2003-031565

(51) Int. Cl.
*B41J 2/00* (2006.01)
*B41J 2/435* (2006.01)

(52) U.S. Cl. ..................................... 347/195; 347/228

(58) Field of Classification Search .................. 347/19, 347/228, 240, 251–254, 236–237, 246–247, 347/131, 133, 140, 188–195; 355/29, 40, 355/68; 358/1.15, 3.23, 504, 509–510; 399/15, 399/53, 59–60; 396/564

See application file for complete search history.

(56) References Cited

U.S. PATENT DOCUMENTS

| 4,751,377 A | | 6/1988 | Ishizaka et al. |
| 5,083,154 A | * | 1/1992 | Terashita et al. ............... 355/68 |
| 5,321,524 A | | 6/1994 | Yanagita |
| 5,859,933 A | | 1/1999 | Sasanuma et al. |
| 6,297,873 B1 | * | 10/2001 | Furuya .......................... 355/40 |
| 6,616,262 B2 | * | 9/2003 | Nakajima et al. ............. 347/19 |
| 6,624,876 B2 | * | 9/2003 | Fukuda et al. ................. 355/29 |
| 6,825,944 B1 | * | 11/2004 | Noda ......................... 358/1.15 |
| 2003/0091347 A1 | * | 5/2003 | Goto et al. .................. 396/564 |

FOREIGN PATENT DOCUMENTS

| EP | 0 487 247 A2 | 5/1992 |
| JP | 62-249138 A | 10/1987 |
| JP | 2000-284382 A | 10/2000 |

* cited by examiner

*Primary Examiner*—Hai Pham
(74) *Attorney, Agent, or Firm*—Frishauf, Holtz, Goodman & Chick, P.C.

(57) ABSTRACT

An image processing apparatus, comprising: an exposing device for exposing an image forming material so as to form a latent image on the image forming material based on image data; a developing device for developing and visualizing the latent image on the exposed image forming material so as to form an image; a measuring device for measuring the image density of the image on the developed image forming material; a calibrating device for forming a table to define a relation between an image signal and image density on the basis of plural different test image data and measured-image densities thereof; a storing device for storing a characteristic change model indicating a characteristic change of at least one of the exposing device and the developing device with time; a difference calculating device to calculate a density difference on the basis of the characteristic change model between the time of forming the table and the time of forming an image based on image signal of diagnostic image data; and a correcting device for correcting the table on the basis of the density difference calculated by the difference calculating device.

42 Claims, 21 Drawing Sheets

CONVEYANCE DIRECTION

IMAGE PROCESSING APPARATUS, IMAGE PROCESSING METHOD, AND PROGRAM

FIELD OF THE INVENTION

This invention relates to an image processing apparatus, an image processing method, and a program, and in particular, to an image processing apparatus, an image processing method, and a program capable of making a finished film have a proper density and always outputting a proper density stably in an image formation.

BACKGROUND OF THE INVENTION

As regards a laser imager (an image processing apparatus) for a medical use, a requirement for its basic function to output the image density always stably is very strong because a diagnosis image is expressed in a density gradation.

Further, in a laser imager for medical use, there is provided what is called a calibration function because its image formation section is controlled so as to make a digital or video signal (specifying density signal) transmitted from a diagnosis apparatus or a photographing apparatus a constant density on a film.

However, although a constant density can be obtained immediately after the practice of calibration, with the processing of the films after the calibration, image density fluctuates due to various kinds of factor. In particular, density fluctuation tends to occur in a process using a thermal development device; for example, density fluctuations as described below can be considered.
(1) a fluctuation in the exposure system caused by the temperature rise in the machine (for example, the fluctuation of the AOM light quantity and the LD wavelength);
(2) a fluctuation of the thermal development characteristics such as the temperature rise in the thermal development cooling-conveyance section caused by the film processing;
(3) a fluctuation of the sensitivity characteristics of a film preserved in the machine;
(4) a fluctuation of the characteristics of the thermal development drum due to the attachment of fatty acid or the like caused by the film processing; and
(5) use of films having different thermal development characteristics.

Among the above-mentioned fluctuations, as regards the fluctuations such as (1), (2), and (5), if the apparatus used is specified, a characteristic fluctuation caused by use can be estimated on the basis of a previous experiment, and it can be cancelled by a feed-forward control (to be abbreviated to "FF" as occasion demands).

On the other hand, as regards the fluctuations such as (3) and (4), because they are difficult to foresee previously, sometimes it is used what is called a patch density method in which the finish density which has been subject to the overall influence including the influences of (3) and (4) is measured and a feedback (to be abbreviated to "FB" as occasion demands) correction is applied to the image formations for next print.

This patch density method is such one that a rectangular area of an order of 5 mm×10 mm on a specified position of a film is exposed to a predetermined light quantity, the finish density of this area is measured, and on the basis of the difference from the density to be expected (hereinafter referred to as "a density for comparison"), by the application of an FB correction to make the images on the next image formation have an optimum density, the exposure quantity and/or thermal development conditions are changed.

As one of the patch density methods, it is known a laser recording apparatus (an image processing apparatus) which measures the film density after thermal development by means of a transmission type sensor and feeds back the result to the laser light quantity (for example, the publication of the unexamined patent application S62-249138).

However, in this method, even though there is a fluctuation or a measurement error in the patch density measurement, a correction is necessarily applied to the prints each time; this is not desirable.

Further, in a thermal development process, generally speaking, processing is prohibited until the heating drum and the surrounding members come to have a specified temperature; however, the development characteristic changes from one immediately after the apparatus becomes ready to one after a plurality of prints have been produced, and the image density tends to become high because the temperature of the cooling-conveyance section rises with the processing.

It is known an image recording apparatus which, in order to prevent this, detects the temperature of the cooling-conveyance section and applies a correction to the exposure (exposing device) means (for example, the publication of the unexamined patent application 2000-284382); thus, even though there is a fluctuation or a measurement error in the patch density measurement, the influence can be cancelled.

However, also the apparatus described in the above-mentioned patent application does not notice the influence of the deterioration of the film with the processing of the films, and the influence of it still exists; therefore, it has been difficult to stabilize the image density.

However, the exposure system and the thermal development system contains factors of dispersion among apparatus, and films change with the processing of the films; therefore, there is a problem that the setting of the amount of this characteristic change and the density for comparison is easy to become erroneous. Accordingly, if the setting of the above-mentioned amount of the characteristic change and the density for comparison is done erroneously, a density lowering or a density rise is produced as the result, even though the process systems reproduce a density in accordance with the setting.

SUMMARY OF THE INVENTION

Hence, the inventors of this invention found that when they adjusted a content of FF control and/or an FB control, a calibration LUT (look-up table). Based on a characteristic change model considering the dispersion of apparatus and the change of the film with the passage of time, a proper result could be obtained; this has resulted in the present invention. It is an object of this invention to provide an image processing apparatus, an image processing method, and a program capable of making a finished film have a proper density in an image formation without a useless consumption of film by the removal of the influence of the change of the characteristics of the apparatus with the passage of time through a minimum amount of calibration. It is another object of this invention to provide an image processing apparatus, an image processing method, and a program capable of obtaining a stable image density even in the case where an image formation is carried out by means of a thermally developable photosensitive film which deteriorates with the passage of time.

Further, other objects of this invention will be clarified by the following description.

[Means for Solving the Problem]

The above-mentioned problems can be solved by any one of the following structures of the invention.

(1-1) An image processing apparatus equipped with an exposure (exposing device) means for forming a latent image on a film through an exposure based on image data for test and image data for diagnosis, a development means for visualizing an image by the development of said exposed film, a measurement means for measuring the density of a developed film, and a calibration means for preparing a correction table which specifies an image density corresponding to an image signal from image data for test and the measurement result of the density of an image on a film visualized through the development of the film exposed on the basis of the image data for test, characterized by further being equipped with a storage means for storing a characteristic change model representing the characteristic change with the passage of time of said exposure means and/or said development means, a difference calculating means for calculating the difference of the density between the point of time said correction table was prepared and the point of time an image formation based on an image signal of diagnosis image data is carried out on the basis of said characteristic change model, and a modification means for modifying said correction table on the basis of the result of calculation by said difference calculating means.

(1-2) An image processing apparatus as set forth in the structure (1-1) characterized by the aforesaid storage means storing a characteristic change model for a change starting from the point of time of the turning-on of the power source.

(1-3) An image processing apparatus equipped with an exposure means for forming a latent image on a film through an exposure based on image data for test and image data for diagnosis, a development means for visualizing an image by the development of said exposed film, a measurement means for measuring the density of a developed film, and a calibration means for preparing a correction table which specifies an image density corresponding to an image signal from image data for test and the measurement result of the density of an image on a film visualized through the development of the film exposed on the basis of the image data for test, characterized by further being equipped with a storage means for storing a passage-time film characteristic model representing the characteristic change with the passage of time of said film, a difference calculating means for calculating the difference of the density between the point of time said correction table was prepared and the point of time an image formation based on an image signal of diagnosis image data is carried out on the basis of said passage-time film characteristic model, and a modification means for modifying said correction table on the basis of the result of calculation by said difference calculating means.

(1-4) An image processing apparatus equipped with an exposure means for forming a latent image on a film through an exposure based on image data for test and image data for diagnosis, a development means for visualizing an image by the development of said exposed film, a measurement means for measuring the density of a developed film, and a calibration means for preparing a correction table which specifies an image density corresponding to an image signal from image data for test and the measurement result of the density of an image on a film visualized through the development of the film exposed on the basis of the image data for test, characterized by further being equipped with a first storage means for storing a characteristic change model representing the characteristic change with the passage of time of said exposure means and/or said development means, a second storage means for storing a passage-time film characteristic model representing the characteristic change with the passage of time of said film, a difference calculating means for calculating the difference of the density between the point of time said correction table was prepared and the point of time an image formation based on an image signal of diagnosis image data is carried out on the basis of said characteristic change model and said passage-time film characteristic model, and a modification means for modifying said correction table on the basis of the result of calculation by said difference calculating means.

(1-5) An image processing apparatus as set forth in the structure (1-4) characterized by the aforesaid first storage means storing a characteristic change model for a change starting from the point of time of the turning-on of the power source.

(1-6) An image processing method comprising an exposure process for forming a latent image on a film through an exposure based on image data for test and image data for diagnosis, a development process for visualizing an image by the development of said exposed film, a measurement process for measuring the density of a developed film, a calibration process for preparing a correction table which specifies an image density corresponding to an image signal from image data for test and the measurement result of the density of an image on a film visualized through the development of the film exposed on the basis of the image data for test, and a storage process for storing a characteristic change model representing the characteristic change with the passage of time of said exposure process and/or said development process, characterized by further comprising a difference calculating process for calculating the difference of the density between the point of time said correction table was prepared and the point of time an image formation based on an image signal of diagnosis image data is carried out on the basis of said characteristic change model, and a modification process for modifying said correction table on the basis of the result of calculation by said difference calculating process.

(1-7) An image processing method as set forth in the structure (1-6) characterized by the aforesaid storage process storing a characteristic change model for a change starting from the point of time of the turning-on of the power source.

(1-8) An image processing method comprising an exposure process for forming a latent image on a film through an exposure based on image data for test and image data for diagnosis, a development process for visualizing an image by the development of said exposed film, a measurement process for measuring the density of a developed film, a calibration process for preparing a correction table which specifies an image density corresponding to an image signal from image data for test and the measurement result of the density of an image on a film visualized through the development of the film exposed on the basis of the image data for test, and a storage process for storing a passage-time film characteristic model representing the characteristic change with the passage of time of said film, characterized by further comprising a difference calculating process for calculating the difference of the density between the point of time said correction table was prepared and the point of time an image formation based on an image signal of diagnosis image data is carried out on the basis of said passage-time film characteristic model, and a modification process for modifying said correction table on the basis of the result of calculation by said difference calculating process.

(1-9) An image processing method comprising an exposure process for forming a latent image on a film through an exposure based on image data for test and image data for diagnosis, a development process for visualizing an image by the development of said exposed film, a measurement process for measuring the density of a developed film, a calibration process for preparing a correction table which specifies an image density corresponding to an image signal from image data for test and the measurement result of the density of an image on a film visualized through the development of the film exposed on the basis of the image data for test, and a first storage process for storing a characteristic change model representing the characteristic change with the passage of time of said exposure process and/or said development process, and a second storage process for storing a passage-time film characteristic model representing the characteristic change with the passage of time of said film, characterized by further comprising a difference calculating process for calculating the difference of the density between the point of time said correction table was prepared and the point of time an image formation based on an image signal of diagnosis image data is carried out on the basis of said characteristic change model and said passage-time film characteristic model, and a modification process for modifying said correction table on the basis of the result of calculation by said difference calculating process.

(1-10) An image processing method as set forth in the structure (1-9) characterized by the aforesaid first storage process storing a characteristic change model for a change starting from the point of time of the turning-on of the power source.

(1-11) A program for practicing an image processing method as set forth in any one of the structures (1-6) to (1-10) characterized by being stored in an image processing apparatus.

(2-1) An image processing apparatus comprising
a loading means for holding a thermally developable photosensitive film,
an exposure means for forming an image on a thermally developable photosensitive film on the basis of image data for test or image data for diagnosis,
a thermal development means for developing said exposed film,
a first control means for controlling an exposure means and/or a thermal development means in such a way as to offset a characteristic fluctuation of said exposure means and said thermal development means,
a measurement means for measuring the density of a developed film,
a calibration means for preparing an LUT specifying the output image densities corresponding to inputted image data on the basis of image data for test and an image formed by an exposure based on said image data for test,
a storage means for storing the density measurement result obtained by the application of an exposure of a light quantity obtained by an LUT operation for a specified density to a part of a film on which a diagnosis image is formed at the time of forming a diagnosis image and the measurement of said part of the film by said measurement means and,
a first estimation means for calculating and keeping a film characteristic change on the basis of the data of said storage means, a second control means for controlling the exposure means and/or the thermal development means on the basis of said first estimation means in such a way as to offset the film characteristic change, and
an erasing means for clearing the film characteristic change of said first estimation means to zero at the time of preparation of an LUT by the calibration means or at the time of operation of the second control means,
characterized by carrying out a control by the first control means and the second control means in the case where an image formation is resumed after a stop of the apparatus for a period of time not shorter than a specified time.

(2-2) An image processing apparatus as set forth in the structure (2-1) characterized by the aforesaid estimation means calculating and keeping a film characteristic change every time the apparatus stops for a specified period of time.

(2-3) An image processing apparatus comprising
a loading means for holding a thermally developable photosensitive film,
an exposure means for forming an image on a thermally developable photosensitive film on the basis of image data for test or image data for diagnosis,
a thermal development means for developing said exposed film,
a first control means for controlling an exposure means and/or a thermal development means in such a way as to offset a characteristic fluctuation of said exposure means and said thermal development means,
a measurement means for measuring the density of a developed film,
a calibration means for preparing an LUT specifying the output image densities corresponding to inputted image data on the basis of image data for test and an image formed by an exposure based on said image data for test,
a storage means for storing the density measurement result obtained by the application of an exposure of a light quantity obtained by an LUT operation for a specified density to a part of a film on which a diagnosis image is formed at the time of forming a diagnosis image and the measurement of said part of the film by said measurement means,
a third control means for controlling said exposure means and/or said thermal development means on the basis of the difference between the density measurement result of said film part and a predetermined density for comparison during a specified period of time after the loading of said film,
a second estimation means for calculating and keeping a film characteristic change through converting the amount of control carried out lastly in said third control means from the density measurement result stored in said storage means after a predetermined period of time after the loading of said film,
a fourth control means for controlling an exposure means and/or a thermal development means on the basis of said second estimation means in such a way as to offset this film characteristic change, and
an erasing means for clearing the film characteristic change of said second estimation means to zero at the time of preparation of an LUT by the calibration means or at the time of operation of the fourth control means,
characterized by carrying out a control by the first control means and the second control means in the case where an image formation is resumed after a stop of the apparatus for a period of time not shorter than a specified time.

(2-4) An image processing apparatus as set forth in the structure (2-3) characterized by the aforesaid estimation means calculating and keeping a film characteristic change every time the apparatus stops for a specified period of time.

(2-5) An image processing method comprising a loading process for holding a thermally developable photosensitive film, an exposure process for forming an image on a thermally developable photosensitive film on the basis of image data for test or image data for diagnosis, a thermal development process for developing said exposed film, a first control process for controlling an exposure process and/or a thermal development process in such a way as to offset a characteristic fluctuation of said exposure process and said thermal development process, a measurement process for measuring the density of a developed film, a calibration process for preparing an LUT specifying the output image densities corresponding to inputted image data on the basis of image data for test and an image formed by an exposure based on said image data for test, a storage process for storing the density measurement result obtained by the application of an exposure of a light quantity obtained by an LUT operation for a specified density to a part of a film on which a diagnosis image is formed at the time of forming a diagnosis image and the measurement of said part of the film by said measurement process, a first estimation process for calculating and keeping a film characteristic change on the basis of the data of said storage process, a second control process for controlling the exposure process and/or the thermal development process on the basis of said first estimation process in such a way as to offset the film characteristic change, and an erasing process for clearing the film characteristic change of said first estimation means to zero at the time of preparation of an LUT by the calibration process or at the time of operation of the second control process, characterized by carrying out a control in the first control process and the second control process in the case where an image formation is resumed after a stop of the apparatus for a period of time not shorter than a specified time.

(2-6) An image processing method as set forth in the structure (2-5) characterized by the aforesaid estimation process calculating and keeping a film characteristic change every time the apparatus stops for a specified period of time.

(2-7) An image processing method comprising a loading process for holding a thermally developable photosensitive film, an exposure process for forming an image on a thermally developable photosensitive film on the basis of image data for test or image data for diagnosis, a thermal development process for developing said exposed film, a first control process for controlling an exposure process and/or a thermal development process in such a way as to cancel a characteristic fluctuation of said exposure process and said thermal development process, a measurement process for measuring the density of a developed film, a calibration process for preparing an LUT specifying the output image densities corresponding to inputted image data on the basis of image data for test and an image formed by an exposure based on said image data for test, a storage process for storing the density measurement result obtained by the application of an exposure of a light quantity obtained by an LUT operation for a specified density to a part of a film on which a diagnosis image is formed at the time of forming a diagnosis image and the measurement of said part of the film by said measurement process, a third control process for controlling said exposure process and/or said thermal development process on the basis of the difference between the density measurement result of said film part and a predetermined density for comparison during a specified period of time after the loading of said film, a second estimation process for calculating and keeping a film characteristic change through converting the amount of control carried out lastly in said third control process from the density measurement result stored in said storage process after a predetermined period of time after the loading of said film, a fourth control process for controlling an exposure process and/or a thermal development process on the basis of said second estimation process in such a way as to offset this film characteristic change, and an erasing process for clearing the film characteristic change of said second estimation process to zero at the time of preparation of an LUT by the calibration process or at the time of operation of the fourth control process, characterized by carrying out a control by the first control process and the second control process in the case where an image formation is resumed after a stop of the apparatus for a period of time not shorter than a specified time.

(2-8) An image processing method as set forth in the structure (2-7) characterized by the aforesaid estimation process calculating and keeping a film characteristic change every time the apparatus stops for a specified period of time.

(2-9) A program for making a computer practice an image processing method described in any one of the structures (2-5) to (2-8) characterized by being stored in an image processing apparatus.

DETAILED DESCRIPTION OF THE PREFERRED EMBODIMENT

In the following, the embodiment of this invention will be explained in detail.

This invention is characterized by the control of an image processing apparatus; hence, first of all, the structure of an image processing apparatus which makes the premise of the above-mentioned control will be explained.

Figure 1:
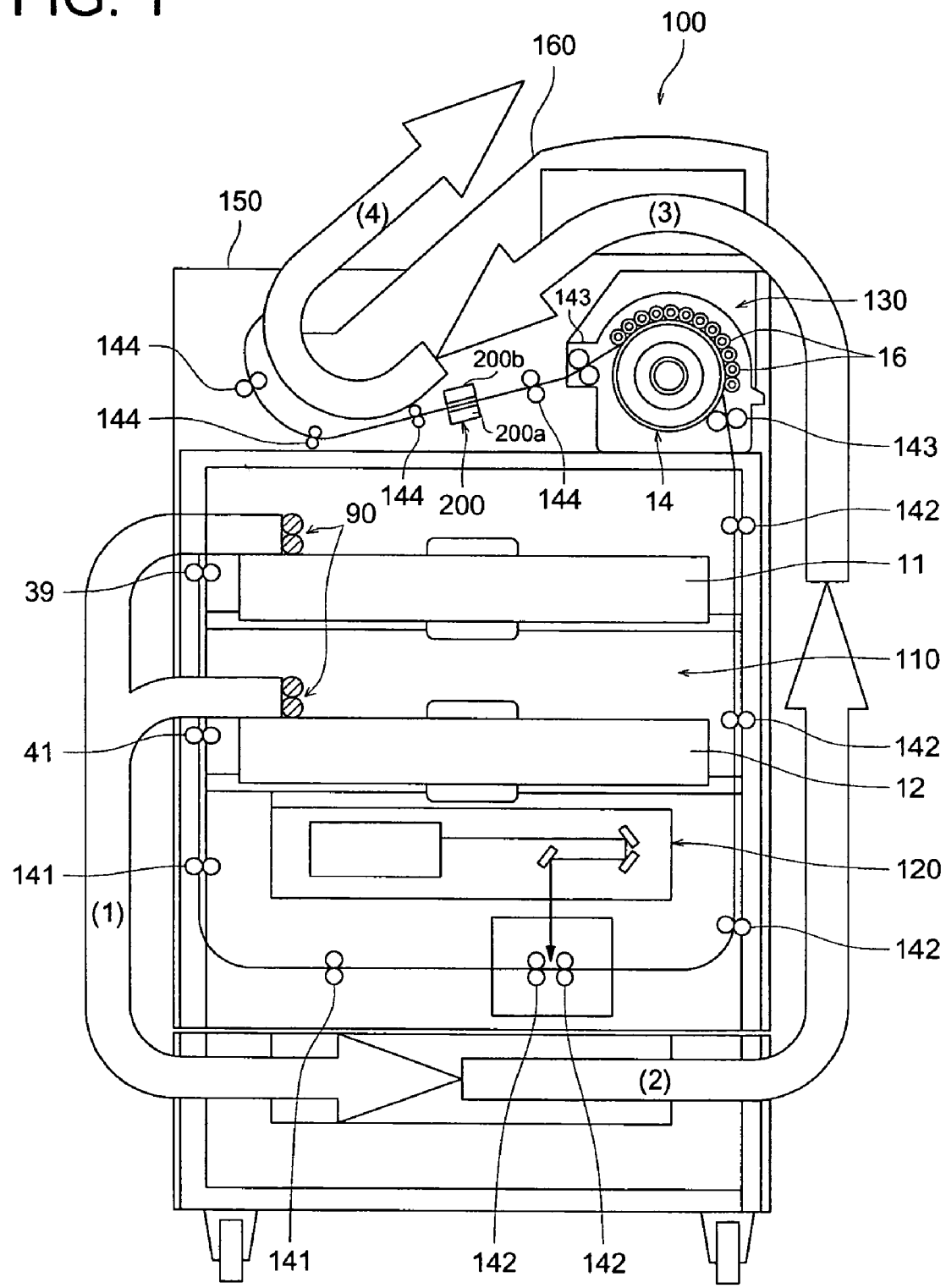
FIG. 1 is the front view showing the essential part of an example of the structure of an image processing apparatus of this invention.
Figure 2:
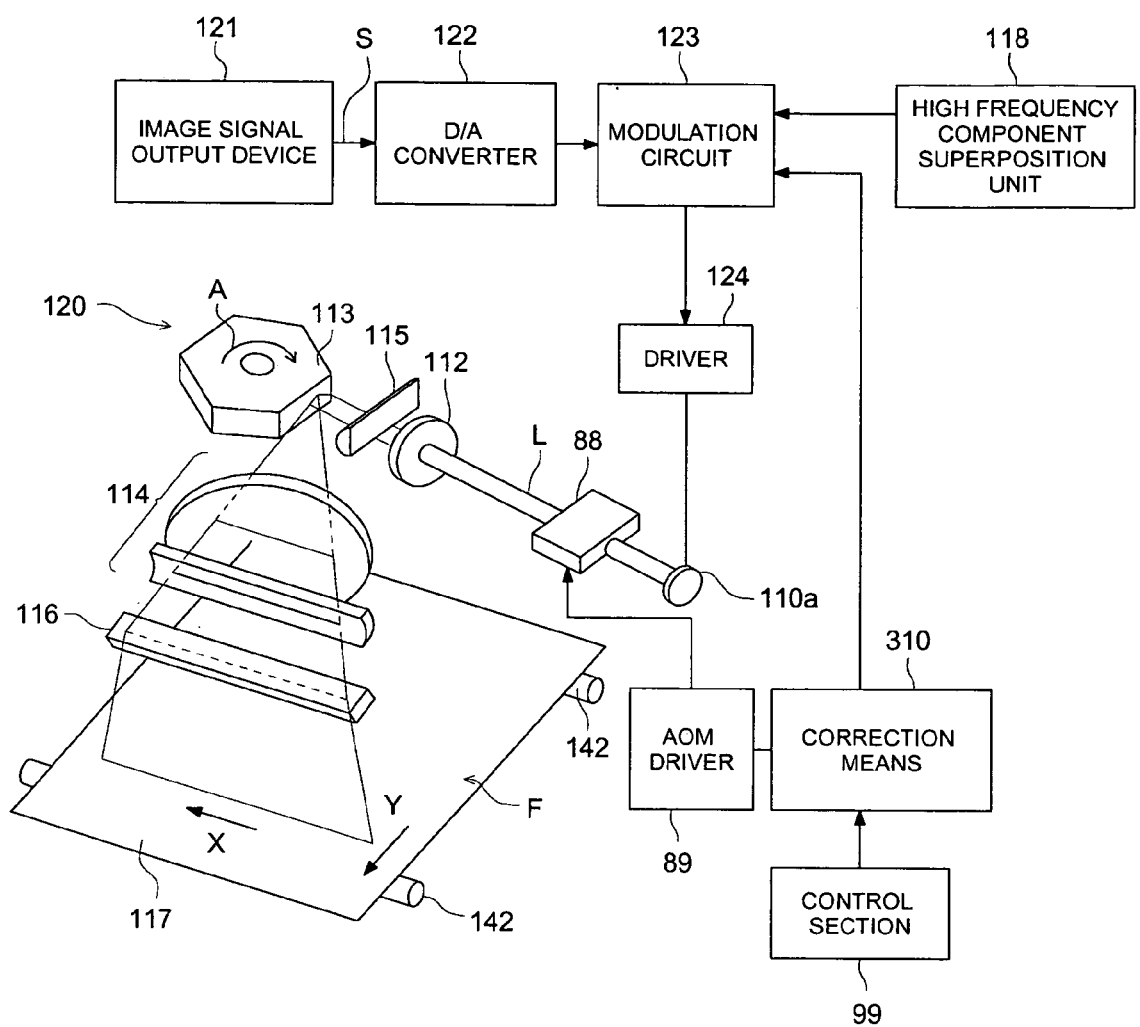
FIG. 2 is a drawing showing the outline of the exposure section (exposing device) of the image processing apparatus shown in FIG. 1.

FIG. 1 is the front view showing the essential part of an example of an image processing apparatus of this invention, and FIG. 2 is a drawing showing the outline of the exposure section (exposing device) of the image processing apparatus showing in FIG. 1.

As shown in FIG. 1, an image processing apparatus 100 is equipped with a feed section 110 comprising a first loading unit 11 and a second loading unit 12 for loading a package of a specified number of sheets of film which is a thermally developable photosensitive material and supply portions 90 for conveying to feed film sheets one by one for exposure and development, an exposure section (exposing device) 120 which is an exposure means for exposing a film sheet fed from the feed section 110 to form a latent image, a development section (developing device) 130 which is a development means for thermally developing a film sheet having a latent image formed, and a densitometer 200 (measuring device) which is an example of a measurement means for obtaining density information by the measurement of the density of a developed film sheet. Further, the image processing apparatus 100 is equipped with a control section 99 for controlling the feed section 110, the exposure section 120, the development section 130, the densitometer 200 (measuring device), etc., and the control section 99 receives a control signal from each of the above-mentioned sections for the control of the whole apparatus.

Film sheets are supposed to be conveyed one by one from the first and second loading units 11 and 12 of the feed section 110 in the direction of the big arrow mark (1) shown in FIG. 1 by pairs of conveyance rollers 39, 41, and 141.

Next, as shown in FIG. 2, the exposure section 120 deflects a laser beam L having a specified wavelength falling within a range of 780 nm to 860 nm with its intensity modulated, by means of a rotary polygonal mirror 113 on the basis of an image data signal S, to scan a film sheet F in the main scanning direction, and the sub-scanning is made by a relative movement of the film sheet F approximately in the horizontal direction which is approximately perpendicular to the main scanning direction, to form a latent image on the film sheet F by the use of the laser beam L.

The more concrete structure of the exposure section 120 will be explained in the following. In FIG. 2, an image signal S which is a digital signal outputted from an image signal output device 121, having been received by the exposure section 120, is converted into an analog signal in a D/A converter 122, and is inputted to a modulation circuit 123. The modulation circuit 123 controls a driver 124 of a laser power source 110a on the basis of this analog signal to make a modulated laser beam L be emitted from the laser power source 110a. Further, a high-frequency component is superposed on the modulation signal of the laser beam L by a high-frequency component superposition unit 118 through the modulation circuit 123 and the driver 124, to prevent the formation of interference fringes in a film sheet.

Further, an acoustooptic modulator 88 is disposed between a lens 112 and the laser power source 110a of the exposure section 120. This acoustooptic modulator 88 is controlled and driven by a acoustooptic modulator (AOM) driver 89 on the basis of a signal from a correction means 310 for adjusting the amount of modulation.

The correction means 310 controls the acoustooptic modulator 88 through the AOM driver 89 on the basis of a correction signal from the control section 99 to make the amount of modulation (the ratio of the emerging light quantity to the incident light quantity) optimum at the time of exposure.

Next, the laser beam L, having been emitted from the laser power source 110a with its light quantity adjusted properly by the acoustooptic modulator 88, after it passes the lens 112, is converged by a cylindrical lens 115 only in the vertical direction, becomes incident on the rotary polygonal mirror 113 rotating in the arrow mark A shown in FIG. 2 as a line image perpendicular to its rotation axis. The rotary polygonal mirror 113 reflects a laser beam L and deflects it in the main scanning direction, and the deflected laser beam L, after having passed an fθ lens 114 made up of a combination of four lens pieces containing a cylindrical lens, is reflected by a mirror 116 which is disposed on the optical path extending in the main scanning direction, and scans the surface 117 of a film sheet F which is being conveyed in the direction of the arrow mark Y (being subjected to the sub-scanning) by a conveyance device 142 repeatedly in the main scanning direction. By doing this, the laser beam L scans the film sheet F over its whole surface 117 to be scanned.

The cylindrical lens of the fθ lens 114 has a function to make an incident laser beam L be converged only in the sub-scanning direction on the surface of a film sheet F to be scanned, and the distance from the fθ lens 114 to the surface of the film F to be scanned is determined to be equal to the focal length of the fθ lens 114 as a whole. In this way, in the exposure section 120, there are provided the cylindrical lens 115 and the fθ lens 114 containing a cylindrical lens, and a laser beam L is once converged on the rotary polygonal mirror only in the sub-scanning direction; therefore, even if the rotary polygonal mirror 113 has a face inclination and a deviation of its axis, the scanning position of the laser beam L never deviates in the sub-scanning direction on the surface of a film F to be scanned, and it is possible to form scan lines with equal intervals. The rotary polygonal mirror 113 has the advantage that it is superior to other optical deflectors such as a galvanometer mirror in terms of the stability of scanning. As explained in the foregoing, a latent image based on an image signal F is formed on a film sheet F. The film sheet F, having a latent image formed on it, is conveyed upward by a plurality of conveyance roller pairs 142 as shown by the arrow mark (2) in FIG. 1.

Next, the development section 130 of the image processing apparatus shown in FIG. 1 will be explained. As shown in FIG. 1, the development section 130 comprises a drum 14 which is capable of being heated during holding a film sheet F on its outer circumference and a plurality of opposed rollers 16 for holding a film sheet between the drum 14 and themselves. The drum 14 is equipped with a heater inside (not shown in the drawing) and thermally develops a film sheet F conveyed by a plurality of roller pairs 143 by keeping it at a temperature not lower than a specified lowest thermal development temperature (for example, about 110° C.) for a specified thermal development time. By doing this, a latent image formed on a film sheet F in the above-mentioned exposure section 120 is converted to form a visible image. Further, the heater of the drum 14 is controlled by the control section 99 shown in FIG. 2, and the adjustment of image density can be made by the changing of the temperature of the heater causing the development temperature to vary.

To the left of the thermal development section 130, there is provided a cooling-conveyance section 150 for cooling a heated film sheet equipped inside with a plurality of conveyance roller pairs 144 and the densitometer 200 (measuring device). A film sheet F detached from the heating drum 14 is cooled while being conveyed in the obliquely left downward direction as shown by the arrow mark (3) in FIG. 1. Then, while the conveyance roller pairs 144 are conveying the cooled film sheet F, the densitometer 200 measures the density of the film sheet F. After that, the plural conveyance roller pairs 144 convey the film sheet F further in the way shown by the arrow mark (4) of FIG. 1, and eject it onto an output tray 160 provided at the right side part on the image processing apparatus 100 in order that the film sheet F may be taken out from the image processing apparatus 100.

Figure 3:
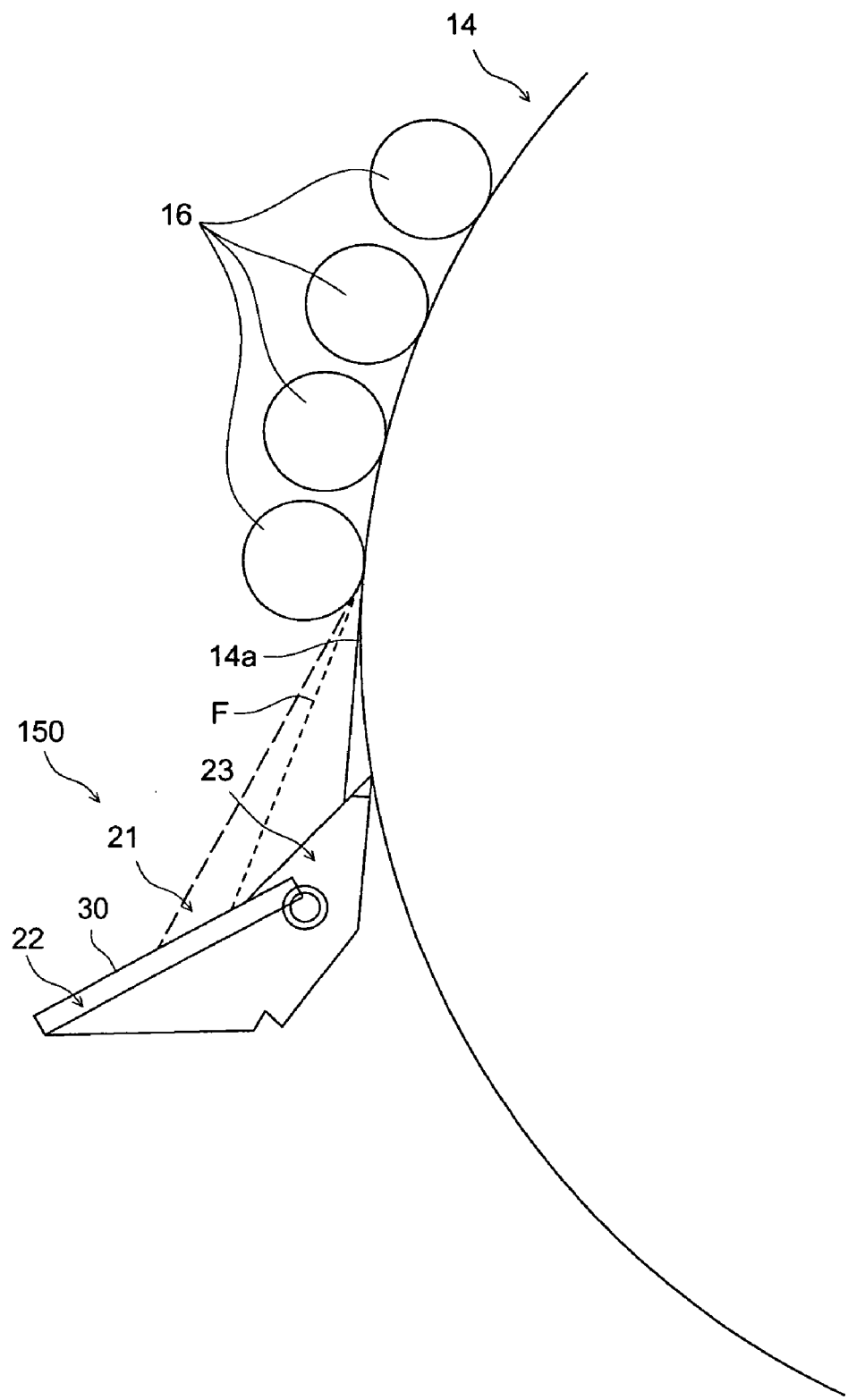
FIG. 3 is the front view showing the essential part of the guide member disposed in the neighborhood of the heating drum in the cooling-conveyance section shown in FIG. 1.

FIG. 3 is the front view showing the essential part of a guide member 21 disposed in the neighborhood of the heating drum 14 in the cooling-conveyance section 150 shown in FIG. 1. As shown in FIG. 3, the guide member 21 is composed of a heat insulating first member 22 which makes up a guide surface 30 for guiding a film sheet F and is made of nonwoven fabric, and a heat conducting second member 23 which is provided at the lower surface of the first member 22 as a unified body with the first member and is made of a metal material such as aluminum. As regards the guide member 21, after a film sheet F shown by the broken line of FIG. 3 is conveyed between the drum 14 and the guide rolls 16 and is detached from the outer circumferential surface 14a, first it reaches the heat conducting second member 23. Subsequently, it is guided along the guide surface 30.

The densitometer 200 shown in FIG. 1 is equipped with a light emitting portion 200a and a light receiving portion 200b, and has a function such that when a film sheet after development has been conveyed as described above and passes between the light emitting portion 200a and the light receiving portion 200b, a light beam emitted from the light emitting portion 200a is received through the film sheet by the light receiving portion 200b, and the density is measured on the basis of the degree of the decrement of the received light quantity.

Next, with reference to the image processing apparatus shown in FIG. 1, the functions characterizing this invention will be explained as divided into five modes of the embodiment. Such functions are to be actualized by being controlled by a software program (a program) previously stored in a specified storing device such as a flash ROM (not shown in the drawing) in the image processing apparatus. An image processing apparatus of this invention is equipped with a microcomputer (a computer) containing a CPU inside (not shown in the drawing), and by the practice of processing of the program by means of such a computer, the following functions can be practiced.

(First Emobodiment)

Figure 4:
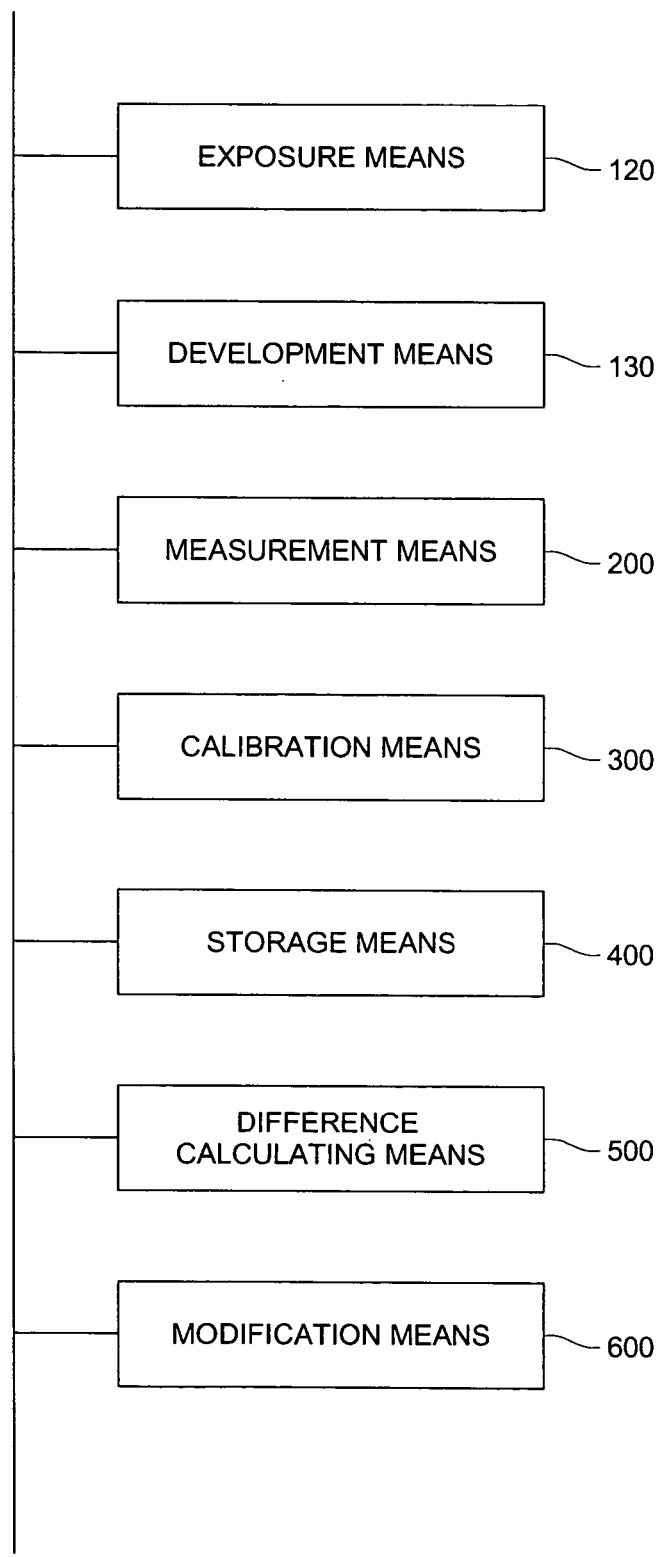
FIG. 4 is a block diagram for explaining the function of an image processing apparatus of the first embodiment for practicing an image processing method of this invention.
Figure 5:
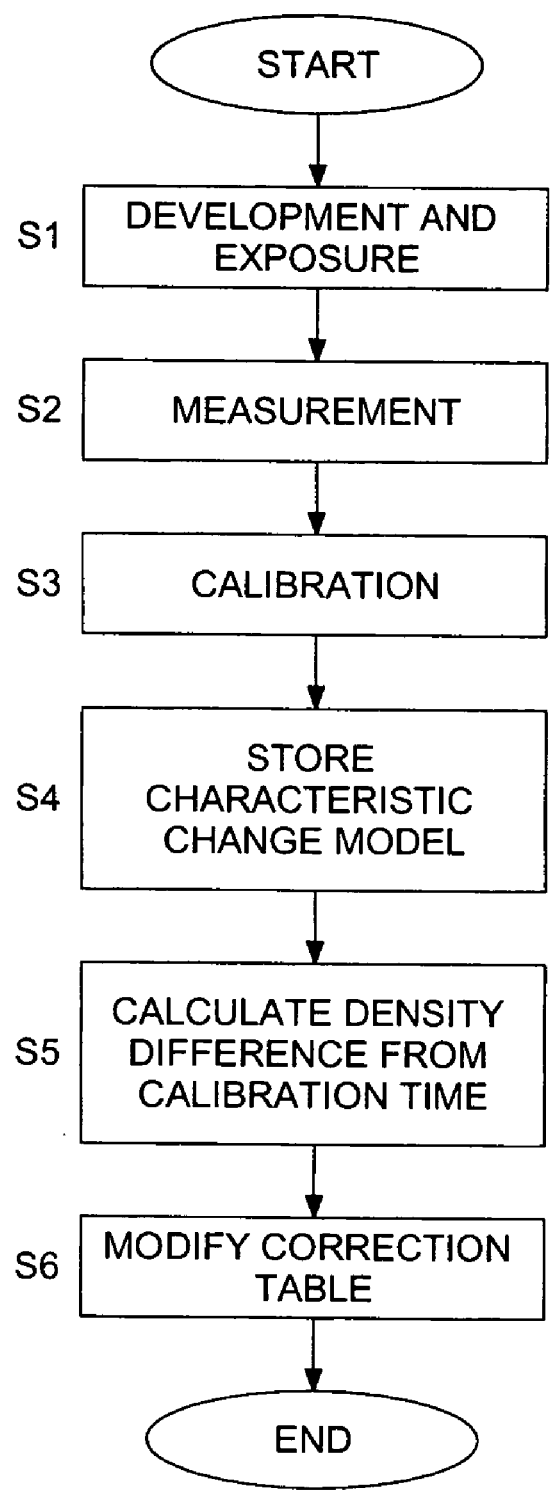
FIG. 5 is a flow chart for explaining a processing by an image processing apparatus of the first embodiment of this invention.

FIG. 4 is a block diagram for illustrating the function of an image processing apparatus of the first embodiment for practicing an image processing method of this invention, and FIG. 5 is a flow chart for explaining the processing by the image processing apparatus shown in FIG. 1.

An image processing apparatus of this embodiment, as shown in FIG. 4, is equipped with an exposure means 120 for practicing an exposure process, a development means 130 for practicing a development process, a measurement means 200 for practicing a measurement process, a calibration means 300 (calibrating device) for practicing a calibration process, a storage means 400 (storing device) for practicing a storage process, a difference calculating means 500 (difference calculating device) for practicing a difference calculating process, and a modification means 600 (correcting device) for practicing a modification process.

As shown in FIG. 5, an exposure and a development are practiced in the exposure means 120 and in the development means 130 respectively (S1). At this time, image data to be subjected to the exposure and development processing are image data for test. The image data for test include a plurality of kinds of image signal as a test pattern.

The density of the film exposed and developed is measured by the measurement means 200 (S2).

From the image data for test and the result of the measurement in the step S2, a correction table for specifying image densities corresponding to image signal is prepared (S3).

The processing of the steps S1 to S3 is what is called a calibration, which makes clear the relation between an image signal (exposure amount) and an image density, for adjusting the image signal (exposure amount) corresponding to image signal (diagnosis data) to make the image density suitable. To state it concretely, from image data for test (data specifying exposure amount) and the result of the measurement of the density of the visualized image on a film sheet by the exposure and development based on the image data for test, the image densities corresponding to the image signal for diagnosis are obtained. The result of the obtaining of an image density corresponding to each image signal is used to prepare a correction table. A correction table is expressed as a lookup table (an LUT) shown in FIG. 6 for example.

Subsequently, a characteristic change model representing a characteristic change of the exposure means 120 and/or the development means 130 is stored in the storage means 400 (S4).

Figure 7A:
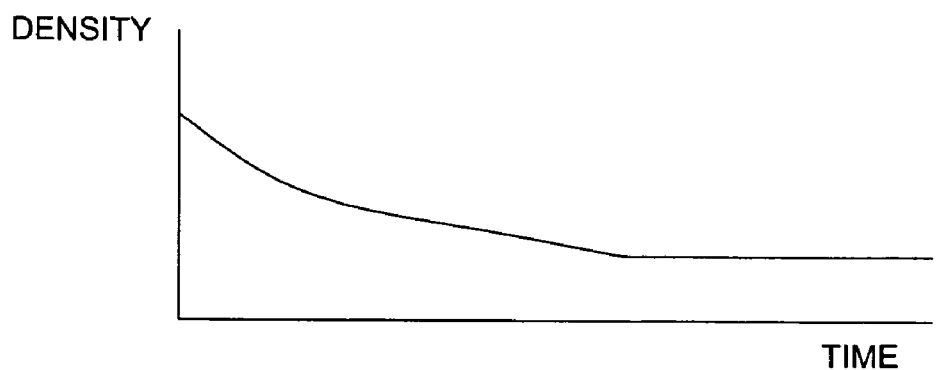
FIGS. 7(a) to 7(c) are drawings showing examples of a characteristic change model of an apparatus.
Figure 7B:
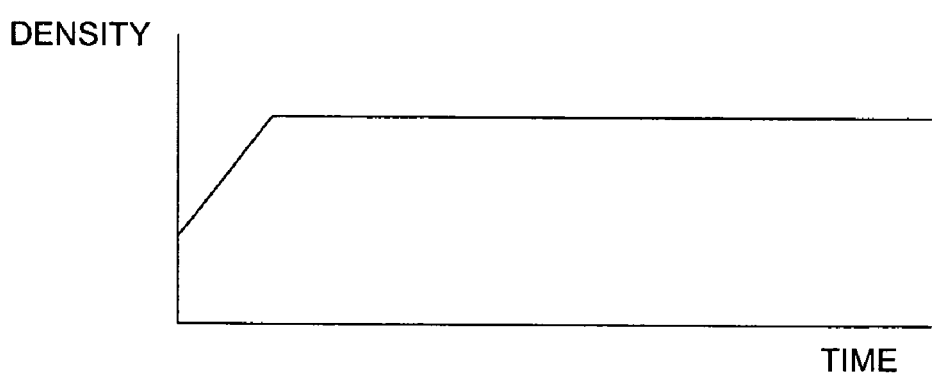
Figure 7C:
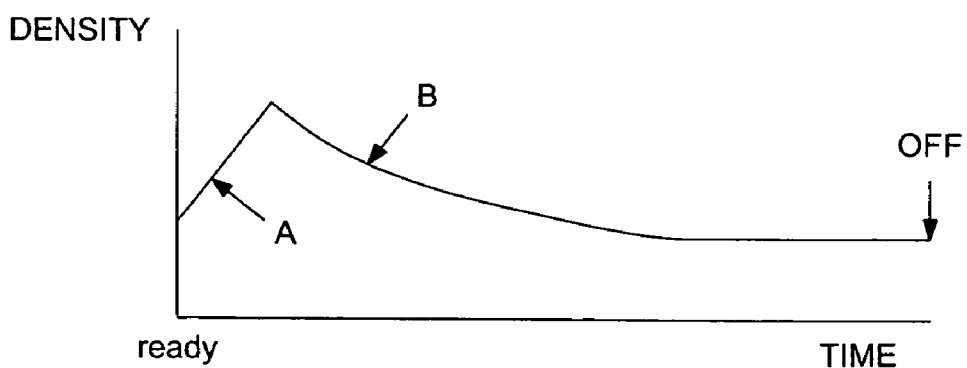

A characteristic change model represents how a characteristic of an exposure system and/or a development system of an apparatus changes with the passage of time correlatively with time and density taken for both coordinate axes. For an example of such a characteristic change model, any one of the examples shown in FIG. 7 can be cited. FIG. 7(a) is an example of the characteristic change model of the exposure means 120 specific to the apparatus, FIG. 7(b) is an example of the characteristic change model of the development means 130 specific to the apparatus, and FIG. 7(c) is an example of the characteristic change model of the exposure means 120 and the development means 130 specific to the apparatus. In FIG. 7(c), the portion of the curve A indicates, as the characteristic change of the thermal development apparatus as an example of an image processing apparatus, the characteristic change after completion of warm-up, wherein the warm-up is a period of 15 to 30 minutes from the turning-on of the power source to the point of time when the processing is enabled (this is called the "ready"). Further, the portion of the curve B is determined from the exposure characteristic and/or development characteristic due to the temperature rise in the apparatus caused by the film processing after that.

For a characteristic change model of this invention, it is desirable to determine the point of time of the turning-on of the power source to be the start point in terms of the effect that this makes it possible to modify a correction table which is calibrated over a broader range. Further, for a characteristic change model of this invention, any model shown in FIG. 7(a) to FIG. 7(c) can be used; however, a model shown in FIG. 7(c) is desirable for the reason that it is fitted to the actual apparatus.

Figure 8:
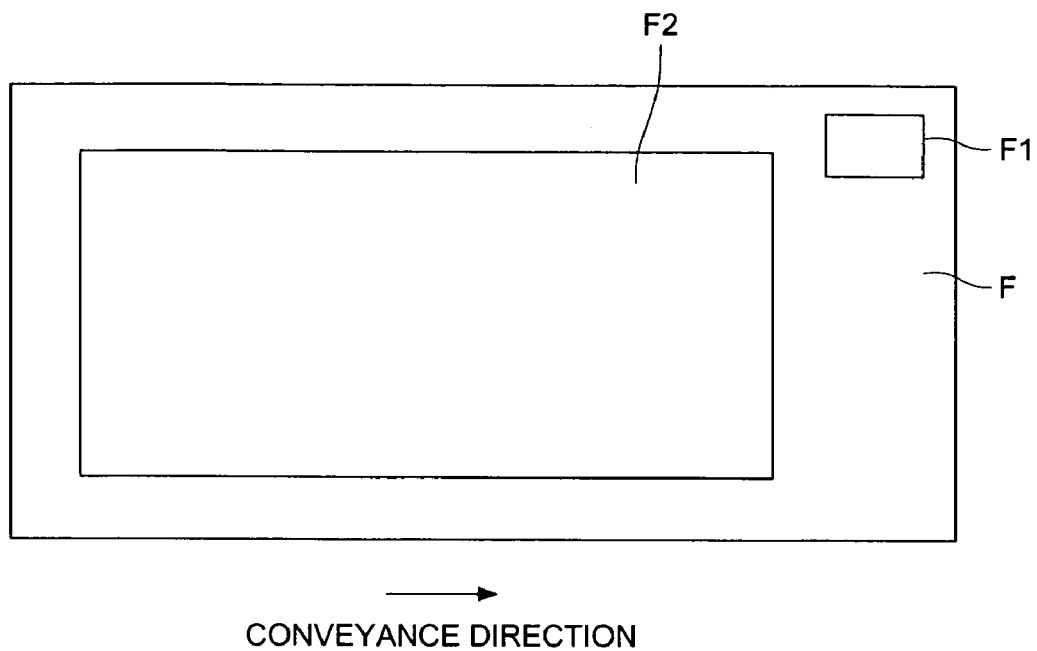
FIG. 8 is a drawing showing the image area and a partial area of a film.

As regards a characteristic change model as described above, it is appropriate to install a characteristic change model which can be determined beforehand from the outside of the apparatus; however, for example, as shown in FIG. 8, it is also appropriate to determine it from the change of the result of the measurement obtained by the repetition of a processing such that an image is formed on a film sheet on the basis of diagnosis image data, while a part of the film sheet on which said image formation is carried out is exposed and developed on the basis of an output data calculated through a lookup table for a specified density and the density is measured. Diagnosis image data are, for example, image data to be processed during a normal operation in an image processing apparatus to form a diagnosis image for medical use. A part of the film sheet on which said image formation is carried out means an area located at an edge portion of a film sheet as shown in FIG. 8 outside the image formation area F2, and an area of about 5 mm×10 mm is used for example.

Figure 9:
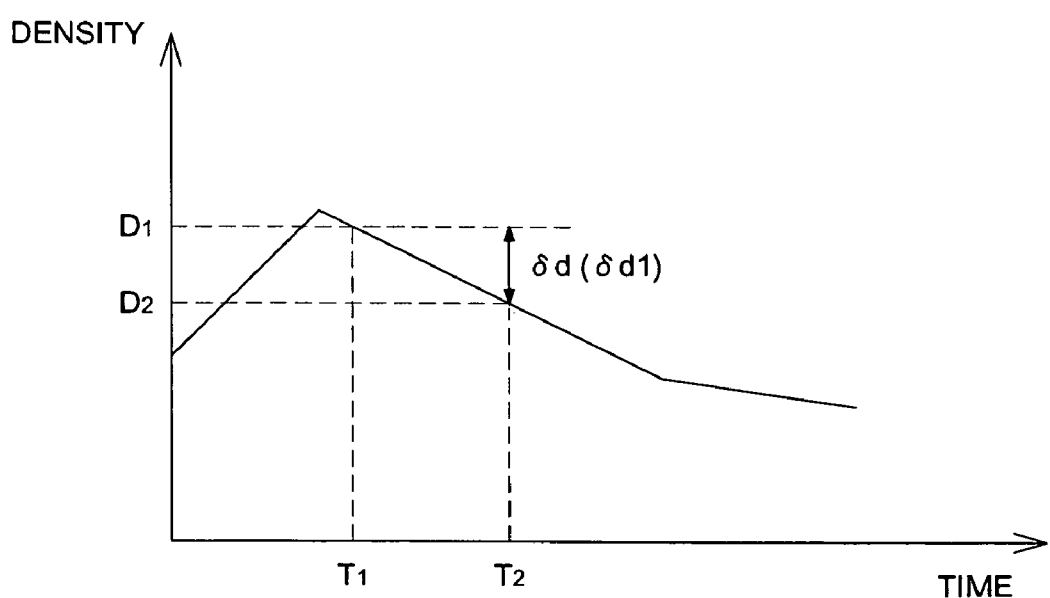
FIG. 9 is a drawing for illustrating the calculation of the difference in a difference calculating means.

Subsequently, on the basis of the above-mentioned characteristic change model stored in the storage means in the step S4, the difference of density between the point of time the above-mentioned correction table was prepared and the point of time an image formation based on diagnosis image data is carried out is calculated in the difference calculating means 500 (S5). To state it concretely, for example, as shown in FIG. 9, assuming that the point of time the exposure and development based on image data for test which become the basis for the preparation of the correction table prepared in the step S3 was carried out is T1 in the characteristic change model stored in the above-mentioned storage means 400, and the point of time an image formation based on an image signal of diagnosis image data is carried out is T2, the difference δd between the density D1 and the density D2 corresponding to the respective times T1 and T2 is obtained.

Figure 10:
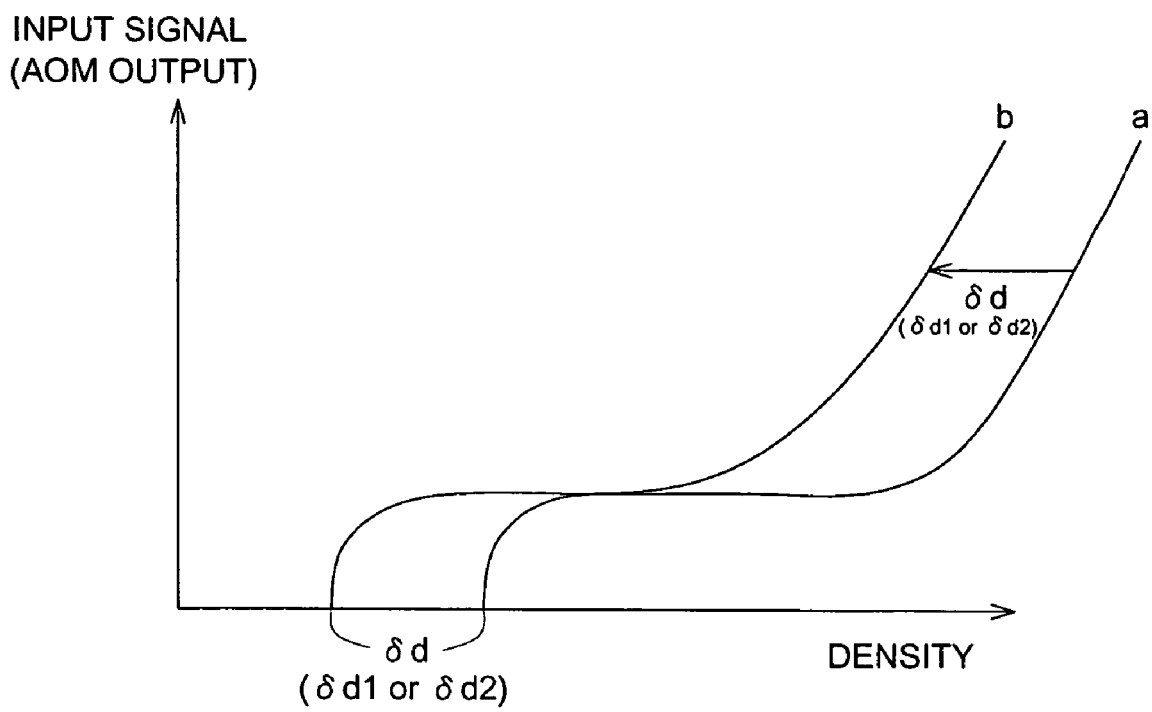
FIG. 10 is drawing for illustrating the modification of an LUT in a modification means.

After that, the correction table prepared in the step S3 is modified on the basis of the difference δd obtained in the step S5 (S6). For example, as shown in FIG. 10, the correction table represented by the LUT of the curve a is modified to become a correction table represented by the LUT of the curve b which is produced by the parallel movement by the difference δd obtained in the step S5 in the density direction. In this modification, it is desirable to change the movement ratio in the high density part and the low density part of the LUT, because for the high density part and the low density part, compared to the middle density part, the change ratio due to the influence of the apparatus is different. By a modification ratio being changed in accordance with the density region in this way, the relation between input image signal and the finish densities becomes constant over the whole density region; this is desirable. Besides, this movement ratio can be determined freely in accordance with the characteristic of the apparatus.

In this way, in a control of this invention, in accordance with a characteristic change model representing a characteristic change of an apparatus, by the modification of an LUT corresponding to a correction table, it is possible to obtain a proper image in which the influence of the characteristic change of the apparatus is eased. That is, because the fluctuation of the density due to the characteristic change with the passage of time specific to the apparatus in the exposure system and the development system is suppressed, it is possible to get rid of the film consumption caused by a calibration to be practiced every time it is required.

(Second Embodiment)

Figure 11:
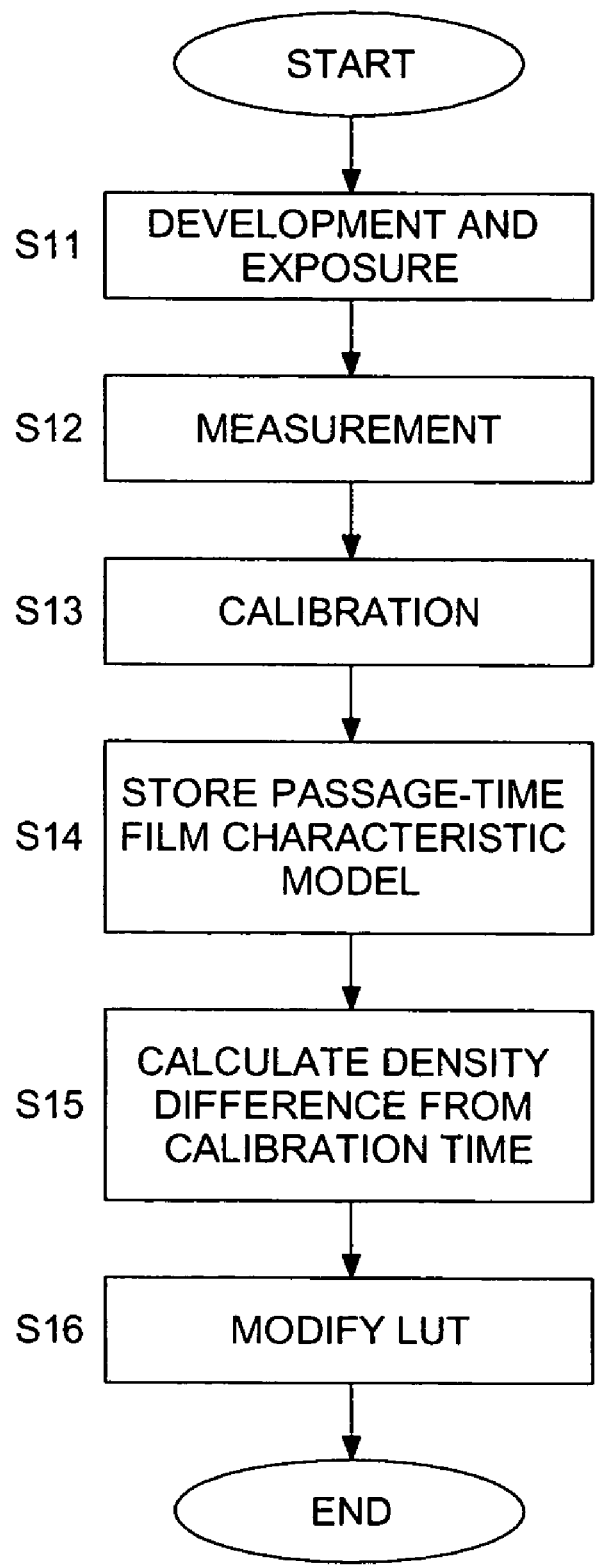
FIG. 11 is a flow chart for explaining a processing by an image processing apparatus of the second embodiment of this invention.

FIG. 11 is a flow chart for explaining a processing by an image processing apparatus of the second embodiment of this invention. In addition, this second embodiment can be explained with reference to a block diagram which is the same as the one shown in FIG. 4.

This embodiment of the invention is different from the first embodiment in terms of the point that the modification of a correction table, which is carried out on the basis of a characteristic change of the exposure means 120 and/or the development means 130 in the first mode, is carried out on the basis of a passage-time film characteristic model.

As shown in FIG. 11, an exposure and development process is carried out in the exposure means 120 and the development means 130 (S11). At this time, image data which are used in the exposure and development process are image data for test. Image data for test contain a plurality of kinds of image signal as a test pattern.

The density of a film sheet which has been subjected to the exposure and development process is measured by a measurement means (S12).

From the image data for test and the result of the measurement made in the step S12, a correction table specifying image densities corresponding to image signal is prepared (S13).

The processing of the steps S11 to S13 is what is called a calibration, which makes clear the relation between an image signal (exposure amount) and image density, for adjusting the image signal (exposure amount) corresponding to image signal (diagnosis data) to make the image density suitable. To state it concretely, from image data for test (data specifying exposure amount) and the result of the measurement of the density of the visualized image on a film sheet by the exposure and development based on the image data for test, image densities corresponding to image signal for diagnosis can be obtained. The result of the obtaining of an image density corresponding to each image signal is used to prepare a correction table. A correction table is presented as a lookup table (an LUT) shown in FIG. 6 for example.

Subsequently, a passage-time film characteristic model representing a characteristic change with the passage of time of a film is stored in the storage means 400 (S14).

A passage-time film characteristic model is a model representing correlatively how a film characteristic (density exhibited by development) changes with the passage of time, with time and density taken for both coordinate axes. As regards a characteristic change model as described above, an example as shown in FIG. 12 can be cited as an example of a measured characteristic change model.

As regards a passage-time film characteristic model as described above, it is appropriate to install, from the outside of the apparatus, a characteristic change model produced from a predetermined characteristic change which can be determined beforehand; however, for example, as shown in FIG. 8, it is also appropriate to determine it from the change of the result of the measurement obtained by the repetition of a processing such that, while an image is formed on a film sheet on the basis of diagnosis image data, a part of the film sheet on which said image is formed is exposed and developed on the basis of an output data calculated through a lookup table for a specified density, and the density is measured. Diagnosis image data are, for example, image data to be processed during a normal operation in an image processing apparatus to form a diagnosis image for medical use. A part of the film sheet on which the above-mentioned image formation is carried out means an area F1 located at an edge portion of a film sheet F as shown in FIG. 8 outside the image formation area F2, and an area of about 5 mm×10 mm is used for example.

Figure 12:
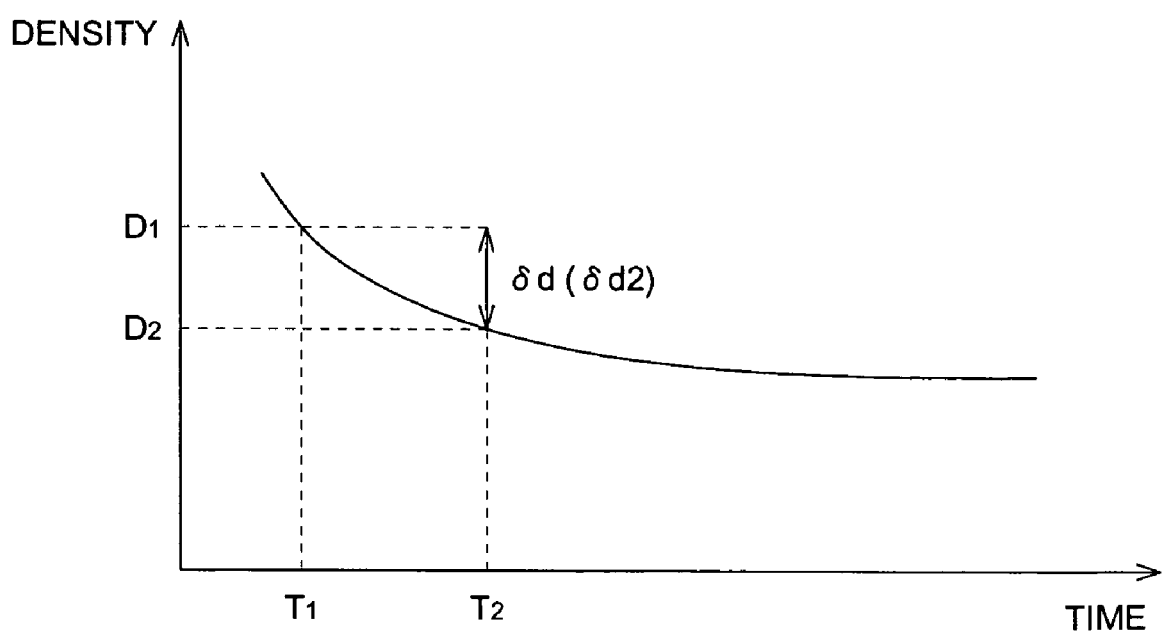
FIG. 12 is a drawing showing an example of a passage-time film characteristic model.

Subsequently, on the basis of the above-mentioned passage-time film characteristic model stored in the storage means in the step S14, the difference of density between the point of time the above-mentioned correction table was prepared and the point of time an image formation based on diagnosis image data is carried out is calculated in the difference calculating means 500 (S15). To state it concretely, for example, as shown in FIG. 12, assuming that the point of time the exposure and development based on image data for test which become the basis for the preparation of the correction table prepared in the step S13 was carried out is T1 in the passage-time film characteristic model stored in the above-mentioned storage means 400, and the point of time an image formation based on an image signal of diagnosis image data is carried out is T2, the difference δd between the density D1 and the density D2 corresponding to the respective times T1 and T2 is obtained.

After that, the correction table prepared in the step S13 is modified on the basis of the difference δd obtained in the step S15 (S16). To state it concretely, as shown in FIG. 10, the correction table represented by the LUT of the curve a is modified to become a correction table represented by the LUT of the curve b which is produced by the parallel movement by the difference δd obtained in the step S15 in the density direction. In this modification, it is desirable to change the movement ratio in the high density part and the low density part of the LUT, because for the high density part and the low density part, compared to the middle density part, the change ratio due to the influence of the apparatus is different. By a modification ratio being changed in accordance with the density region in this way, the relationship between input image signal and the finish density becomes constant over the whole density region; this is desirable. Besides, this movement ratio can be determined freely in accordance with the characteristic of the apparatus.

In this way, in a control of this invention, in accordance with a passage-time film characteristic model representing a characteristic change with the passage of time of a film, by the modification of an LUT corresponding to a correction table, it is possible to obtain a proper image in which the influence of the characteristic change of the film is eased. That is, because it is desirable to preserve a film in a cool dark place, if a film is stored in an apparatus, the characteristic of the film changes with the passage of time; however, it is possible to get rid of the influence of such a change without the film consumption caused by a calibration to be practiced every time it is required.

(Third Embodiment)

Figure 13:
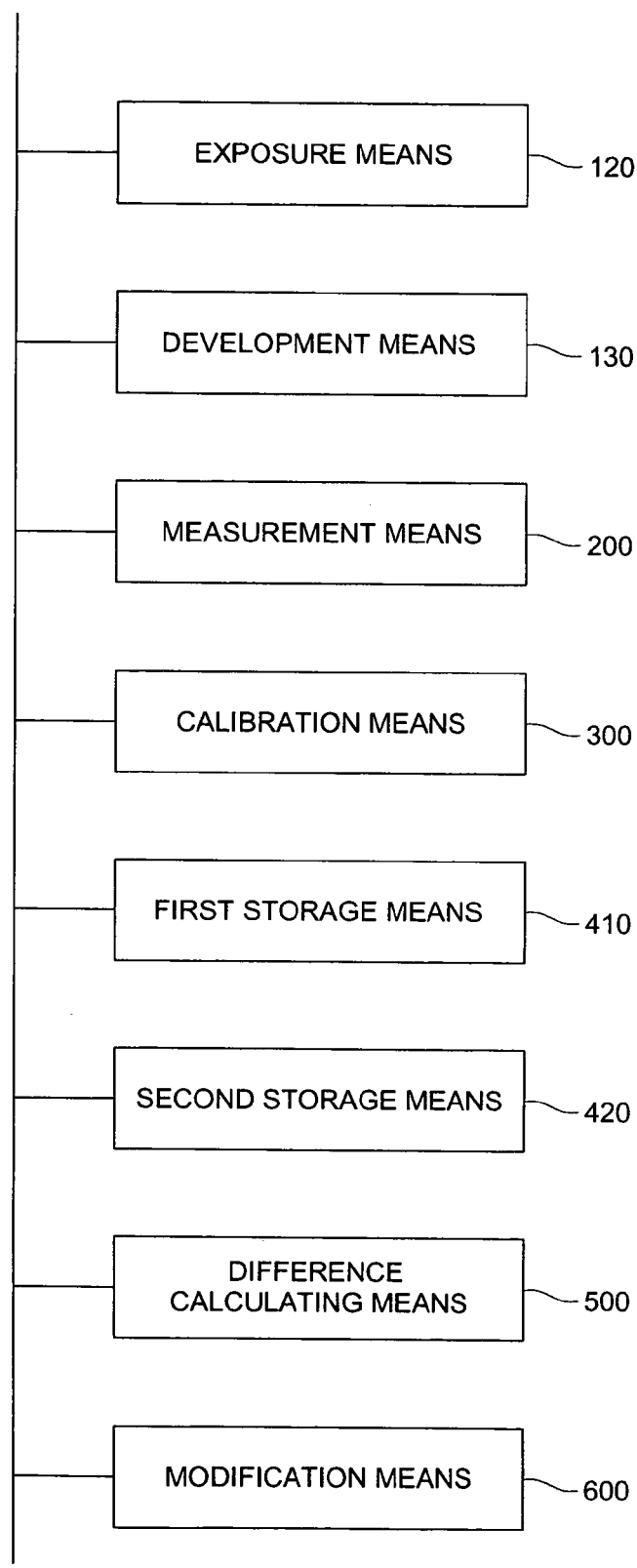
FIG. 13 is a block diagram for illustrating the function of an image processing apparatus of the third embodiment for practicing an image processing method of this invention.
Figure 14:
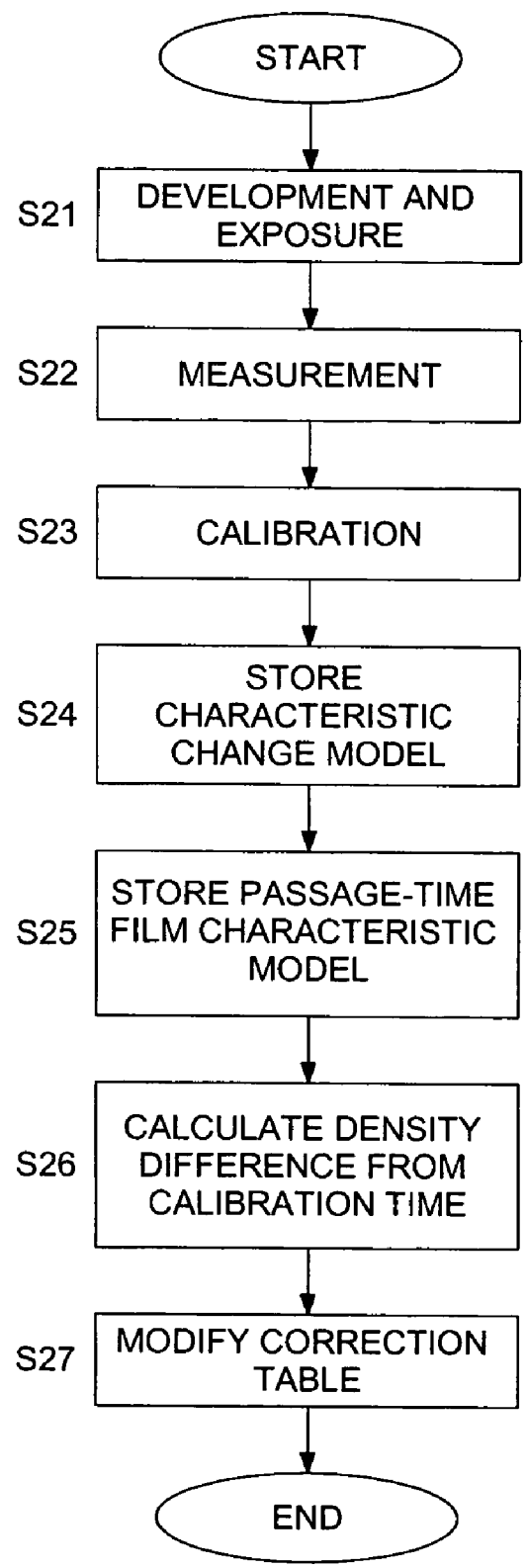
FIG. 14 is a flow chart for explaining a processing by the image processing apparatus shown in FIG. 13.

FIG. 13 is a block diagram for illustrating the function of an image processing apparatus of the third embodiment of this invention, and FIG. 14 is a flow chart for explaining a processing by means of the image processing apparatus shown in FIG. 13.

This embodiment of the invention includes both the modification of a correction table carried out in the first mode on the basis of a characteristic change model of the exposure means 120 and/or a development means 130 and the modification of a correction table carried out in the second mode on the basis of a passage-time film characteristic model of a film.

As shown in FIG. 13, an image processing apparatus of this embodiment of the invention is equipped with an exposure means 120 for practicing an exposure process, a development means 130 for practicing a development process, a measurement means 200 for practicing a measurement process, a calibration means 300 (calibrating device) for practicing a calibration process, a first storage means 410 for practicing a first storage process, a second storage means 420 for practicing a second storage process, a difference calculating means 500 for practicing a difference calculating process, and a modification means 600 (correcting device) for practicing a modification process.

As shown in FIG. 13, an exposure and development process is carried out in the exposure means 120 and the development means 130 (S21). At this time, image data used in the exposure and development process is image data for test. Image data for test contain a plurality of kinds of image signal as a test pattern.

The density of a film subjected to the exposure and development process is measured by the measurement means 200 (S22).

From the image data for test and the result of the measurement made in the step S22, a correction table specifying image densities corresponding to image signal is prepared (S23).

The processing of the steps S21 to S23 is what is called a calibration, which makes clear the relation between image signal and image densities for adjusting the image signal so as to make the image densities suitable. To state it concretely, from image data for test and the result of the measurement of the density of the visualized image on a film sheet by the exposure and development based on the image data for test, image densities corresponding to image signal can be obtained. From the image formed by the exposure and development based on each image signal, an image density corresponding to each kind of image signal can be obtained. The result of the obtaining of an image density corresponding to each image signal is used to prepare a correction table. A correction table is expressed as a lookup table (an LUT) shown in FIG. 6 for example.

Subsequently, a characteristic change model representing a characteristic change of the exposure means 120 and/or the development means 130 is stored in the first storage means 410 (S24), and a passage-time film characteristic model representing a characteristic change with the passage of time of a film is stored in the second storage means 420 (S25). In addition, the processing of the steps S24 and S25 may be practiced simultaneously or in the reverse order.

Subsequently, on the basis of the above-mentioned characteristic change model and passage-time film characteristic model stored in the first storage means and second storage means respectively in the steps S24 and S25, the difference of density between the point of time the above-mentioned correction table was prepared and the point of time an image formation based on diagnosis image data is carried out is calculated in the difference calculating means 500 (S26). To state it concretely, for example, as shown in FIG. 9, assuming that the point of time the exposure and development based on image data for test which become the basis for the preparation of the correction table prepared in the step S23 was carried out is T1 in the characteristic change model stored in the above-mentioned first storage means 410, and the point of time an image formation based on an image signal of diagnosis image data is carried out is T2, the difference δd between the density D1 and the density D2 corresponding to the respective times T1 and T2 is obtained from the characteristic change model. On the other hand, assuming that the point of time the exposure and development based on image data for test which become the basis for the preparation of the correction table prepared in the step S23 was carried out is T1 in the passage-time film characteristic model stored in the above-mentioned second storage means 420, and the present point of time is T2, the difference δd between the density D1 and the density D2 corresponding to the respective times T1 and T2 is obtained from the film characteristic model.

Figure 15:
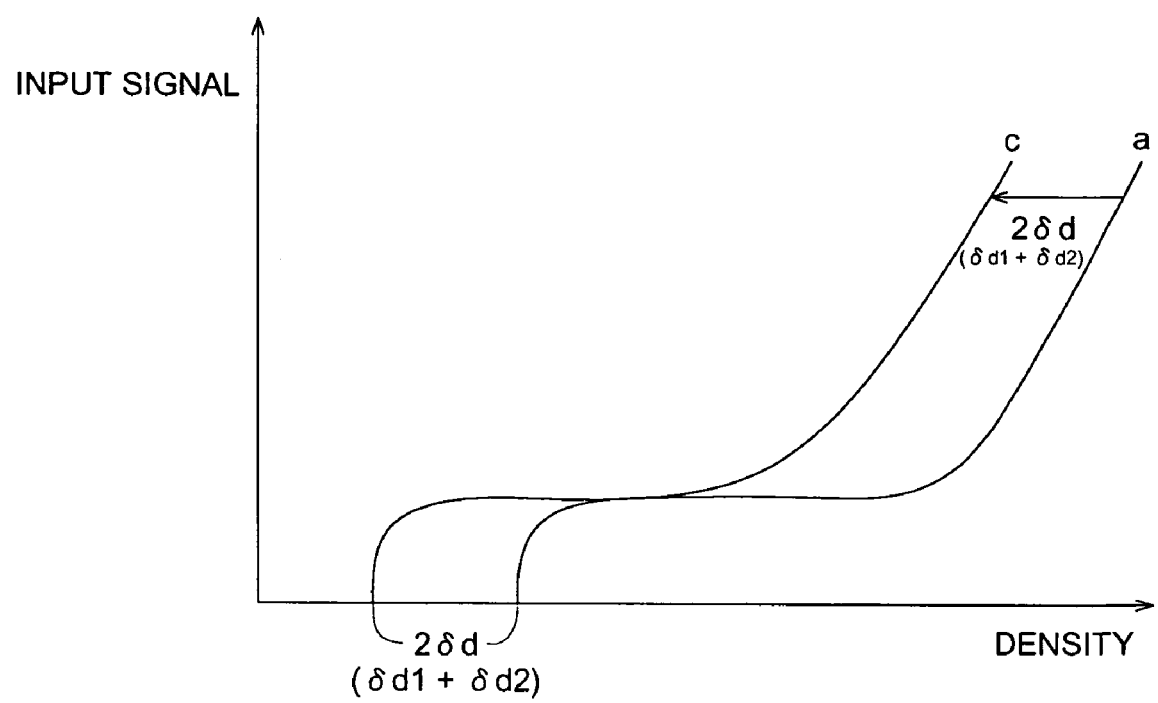
FIG. 15 is a drawing for explaining the modification of an LUT in a modification means.

After that, the correction table prepared in the step S23 is modified on the basis of the difference 2δd obtained in the step S26 (S27). To state it concretely, as shown in FIG. 15, the correction table represented by the LUT of the curve a is modified to become a correction table represented by the LUT of the curve c which is produced by the parallel movement by the difference 2δd obtained in the step S26 in the density direction. In this modification, it is desirable to change the movement ratio in the high density part and the low density part of the LUT, because for the high density part and the low density part, compared to the middle density part, the change ratio due to the influence of the apparatus is different. Besides, this movement ratio can be determined freely in accordance with the characteristic of the apparatus.

In this way, in a control of this invention, in accordance with a characteristic change model representing a characteristic change of an apparatus and a passage-time film characteristic model representing a characteristic change with the passage of time of a film, by the modification of an LUT corresponding to a correction table, it is possible to obtain a proper image in which the influence of the characteristic change of the apparatus and the characteristic change of the film is eased. That is, because it is desirable to preserve a film in a cool dark place, if a film is stored in an apparatus, the characteristic of the film changes with the passage of time and the characteristic change specific to the apparatus occurs in the exposure system and the development system; however, it is possible to get rid of the influence of such a change without the film consumption caused by a calibration to be practiced every time it is required.

(Fourth Embodiment)

Figure 16:
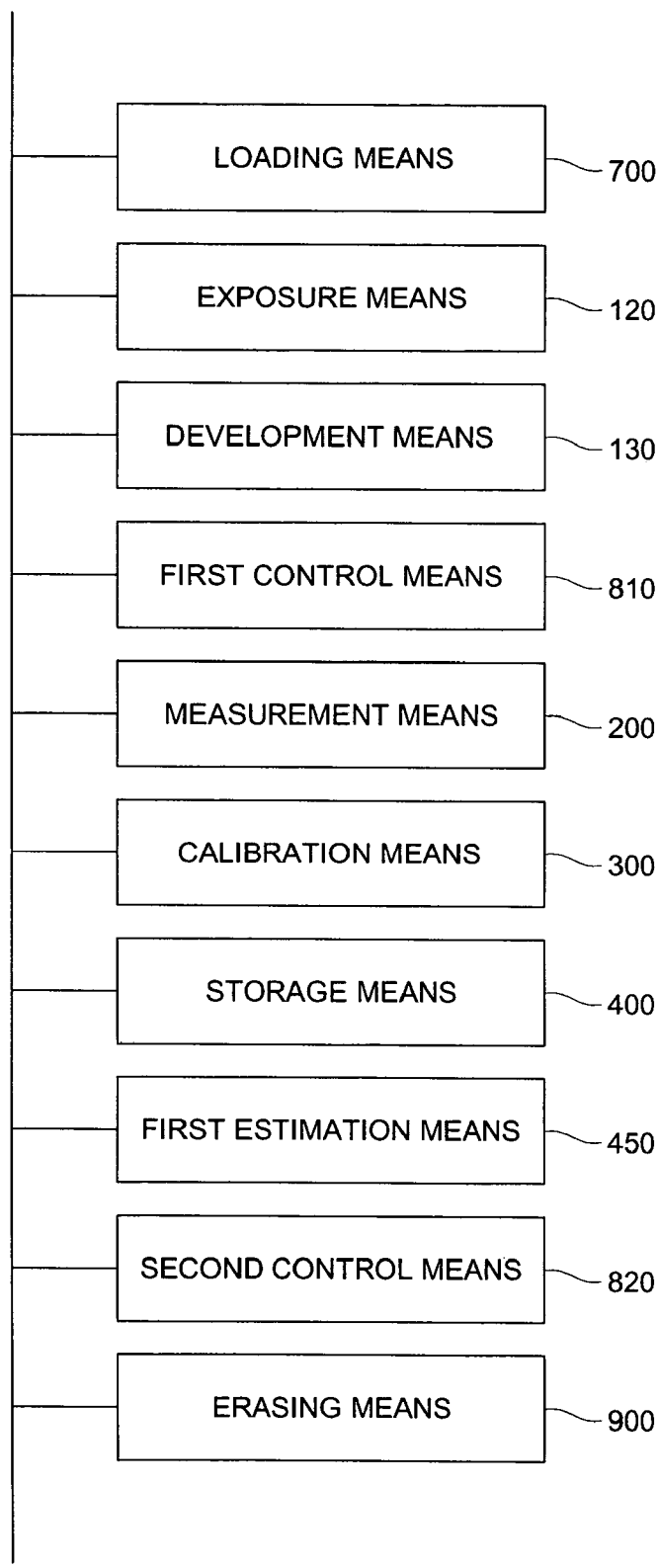
FIG. 16 is a block diagram for illustrating the function of an image processing apparatus of the fourth embodiment for practicing an image processing method of this invention.
Figure 17:
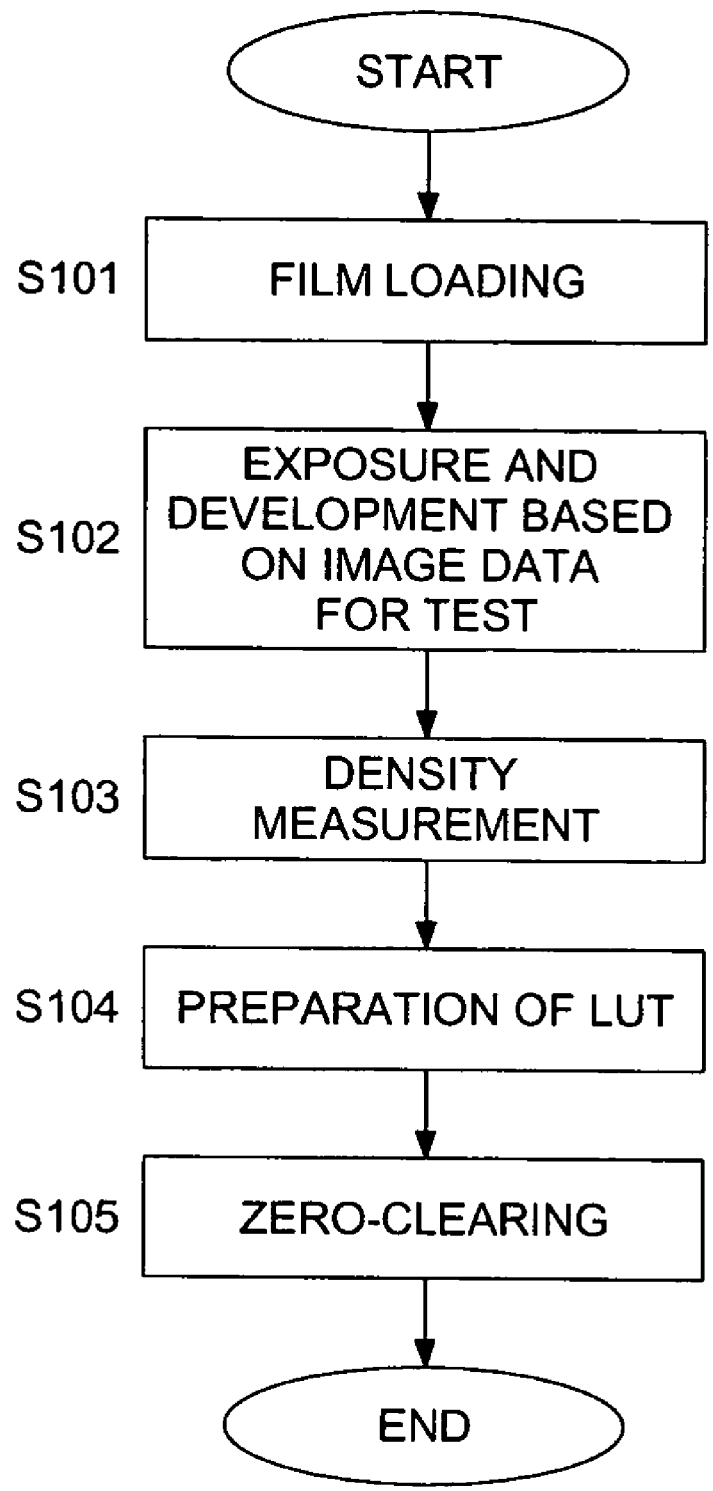
FIG. 17 is a flow chart for explaining the processing at the time of loading a film by the image processing apparatus shown in FIG. 16.
Figure 18:
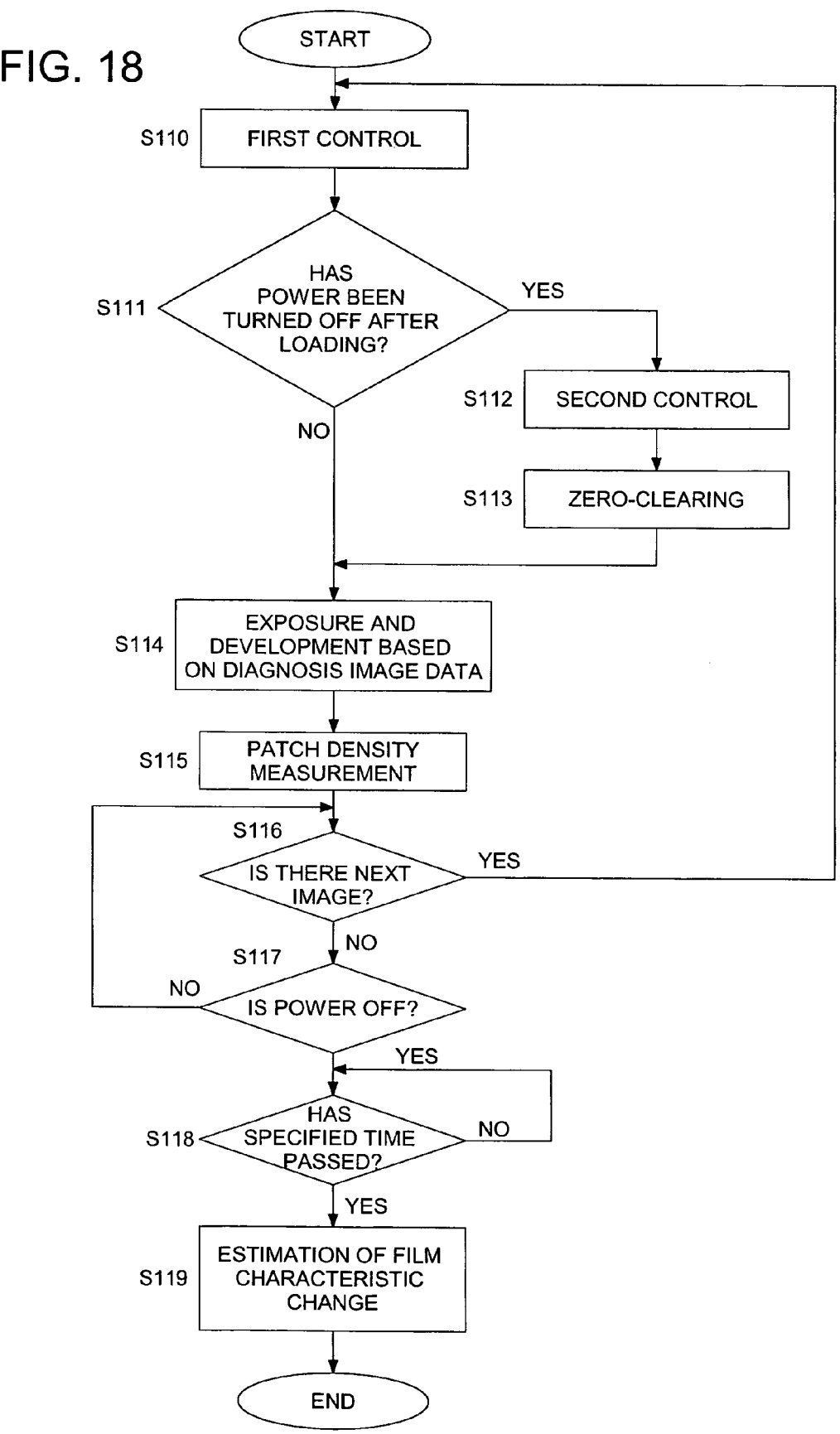
FIG. 18 is a flow chart for explaining the processing at the time of forming a diagnosis image by the image processing apparatus shown in FIG. 16.

FIG. 16 is a block diagram for illustrating the function of an image processing apparatus of the fourth embodiment for practicing an image processing method of this invention, FIG. 17 is a flow chart for explaining a processing at the time of loading film sheets by the image processing apparatus shown in FIG. 16, and FIG. 18 is a flow chart for explaining a processing at the time of forming a diagnosis image by the image processing apparatus shown in FIG. 16.

As shown in FIG. 16, an image processing apparatus of this invention is equipped with a loading means 700 for practicing a loading process, an exposure means 120 for practicing an exposure process, a development means 130 for practicing a development process, a measurement means 200 for practicing a measurement process, a calibration means 300 (calibrating device) for practicing a calibration process, a first control means (controlling device) 810 for practicing a first control process, a storage means 400 for practicing a storage process, a first estimation means 450 (estimation device) for practicing a first estimation process, a second control means (controlling device) 820 for practicing a second control process, and an erasing means 900 (clearing device) for practicing an erasing process.

In addition, the loading means 700 shown in FIG. 16 is equivalent to the first and second loading units 11 and 12 shown in FIG. 1, and the first control means 810 and the second control means 820 shown in FIG. 16 are equivalent to the control section 99 shown in FIG. 2 and the correction means 310 shown in FIG. 2.

(At the Time of Loading Film Sheets)

As shown in FIG. 17, film loading is carried out in the loading means 700 (S101). By the film loading process, thermally developable photosensitive film sheets are held in the loading means.

In the exposure means 120, an exposure is carried out on the basis of image data for test (also called calibration image data), and in the development means 130, a latent image formed by said exposure is developed to become visible (S102). To state it concretely, a film sheet is exposed on the basis of image data which are different from image data for diagnosis (image data for calibration), and the film sheet having a latent image formed by said exposure is heated and conveyed by the development means 130 to develop the latent image to become visible.

In the measurement means 200, the density of the film sheet having an image for test formed is measured (S103). The image for test is an image containing an image formed by an exposure and development process based on image signal of various kinds of density. As regards the measurement of density in the measurement means 200, densities are measured in correspondence with such an image for test.

Figure 6:
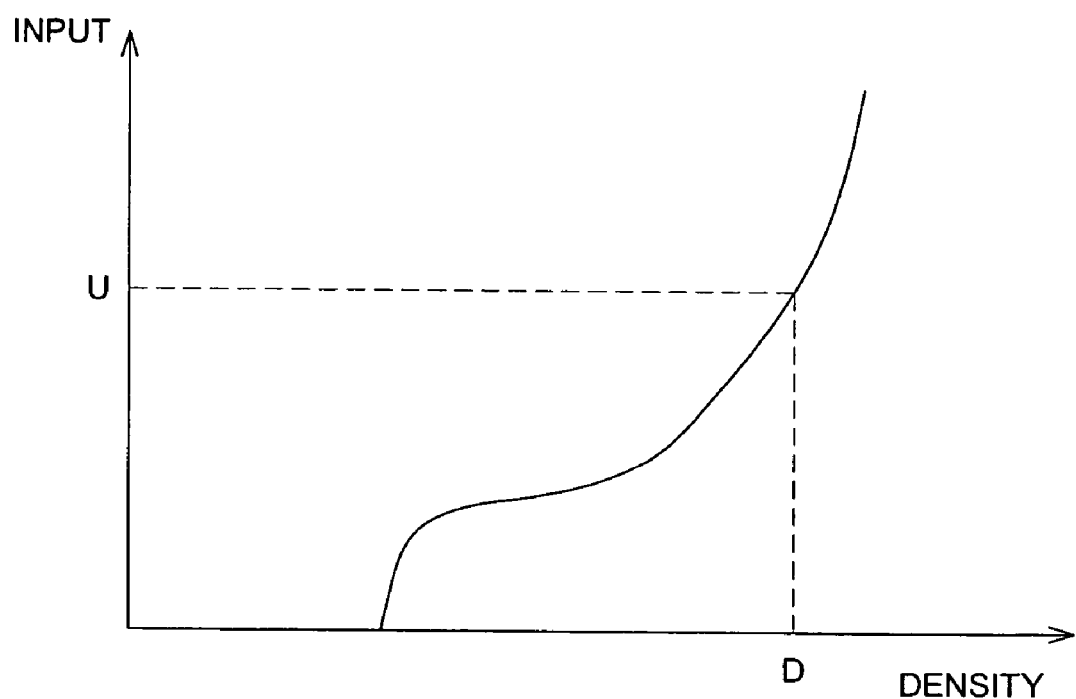
FIG. 6 is a drawing showing an example of an LUT.

After the measurement in the step S103, in the calibration means 300, on the basis of the result of measurement of the calibration image in the above-mentioned measurement means 200, an LUT (a lookup table; also referred to as a correction table in this specification) for relating image data for diagnosis to light quantity levels of the exposure means is prepared (S104). An LUT can be prepared as a graph in which image data for diagnosis are related to light quantity levels (image densities) as shown in FIG. 6 for example.

After the preparation of an LUT is carried out, in the erasing means 900 (clearing device), a film characteristic change kept in the first estimation means 450 (estimation device) to be described later is cleared to zero (S105). "Clearing to zero (clearing off)" means erasing the data of film characteristic change stored in the first estimation means 450.

(At the Time of Forming a Diagnosis Image)

Next, a processing at the time of forming an image for diagnosis will be explained.

In FIG. 18, first, in order to cancel the characteristic change of the apparatus, an adjustment of the exposure system and/or the thermal development system is carried out. In the first control means 810, a control of the exposure means 120 and/or the development means 130 is carried out (S110). To state it concretely, for example, the cooling-conveyance section and/or the exposure means is controlled in accordance with the result of the temperature monitoring by means of a temperature sensor in the apparatus to change the image formation conditions of the apparatus so as to make the imaging formation conditions approximately constant. The first control means can perform a roll similar to that performed by the difference calculating means 500 and the modification means 600 in the above-mentioned first mode of the embodiment.

After the loading of film sheets, whether or not the power source has been turned off is judged in the second control means 820 (S111), and if the power source is judged to have been turned off, on the basis of a film characteristic change estimated in the first estimation means 450 to be described later, in order to offset such a film characteristic change, a control of the exposure means 120 and/or the development means 130 is carried out in the second control means 820 (S112). After the control to offset the film characteristic change has been carried out in the second control means 820 on the basis of the film characteristic change, the film characteristic change kept in the first estimation means 450 is cleared to zero (S113). As regards the steps S112 and S113, because the film characteristic change of the first estimation means 450 is cleared to zero in the step S113, if the control is once made in the second control means 820, a control to substantially offset the film characteristic change is not carried out doubly.

After that, an exposure and a development based on image data for diagnosis are carried out in the exposure means 120 and the development means 130 (S114). At this time, a patch image is formed as well as a diagnosis image. A patch image can be obtained by it that when an image formation is made on the basis of diagnosis image data, a part of a film sheet on which said diagnosis image is formed is exposed by a predetermined exposure light quantity or a light quantity corresponding to a density designated through an LUT. A part of a film sheet on which a diagnosis image is formed is an area as indicated by the F1 located at the edge portion of a film sheet F of FIG. 8 outside the image formation area F2, and for example, an area of about 5 mm×10 mm is used.

The density of the patch which has been exposed and developed by the exposure means 120 and the development means 130 is measured (S115). The result of the density measurement of a part of the film sheet exposed and developed in the step S114 is stored and saved in the storage means 400 as patch data.

Whether or not there are diagnosis image data to become the object of processing next is judged (S116); if there are next diagnosis image data, the procedure returns to S110, and if there is no image data, the apparatus is brought into a ready state with the power source turned off (S117).

If the power source is turned off in the step S117, whether or not the apparatus has been stopped for a specified period of time (S118), and if the apparatus is judged to have been stopped for a specified period of time, on the basis of the result of the density measurement of the patch, a film characteristic change is calculated and kept in the first estimation means 450 (S119). A film characteristic change is calculated in the following way. That is, with a density value designated by an LUT used as a density for comparison, it is compared with the average value of the patch density measurement data throughout a day, and the difference is multiplied by a suitable factor (gain), to determine a film characteristic change. In this way, the first estimation means 450 calculates and keeps a film characteristic change every time the apparatus has been stopped for a specified period of time.

As described in the foregoing, in this invention, the result of the density measurement of a patch produced every time of printing is stored, a film characteristic change (deterioration with the passage of time) is estimated on the basis of patch data for one day, a correction value is determined to offset this, and this correction value is applied to all the prints of the next day. Accordingly, because a characteristic which changes over a comparatively long period of time such as a film deterioration with the passage of time is estimated on the basis of a sufficient number of data, the accuracy of estimation is improved and a more stabilized density can be achieved. In particular, in facilities where a comparatively small amount of film is used in a manner such that one package of film sheets (usually 100 to 150 sheets) loaded once is used over a week or two, the density change day by day can be gradually and certainly corrected, and a good diagnosis performance using the film can be maintained.

In addition, the above-mentioned process is to be repeated until the film runs out, and if film loading is carried out on the midway of one-day operation, a calibration process is practiced, while the correction value for the film deterioration with the passage of time is cleared to zero. This is done because a calibration is practiced using film sheets newly loaded and the influence of the newly loaded film characteristic change is to be reflected thereafter. Patch data accompanied by the continued printing after this are collected, stored, and calculated at the completion of the printing of the day (or before the start of printing of the next day), to be used for estimating the amount of deterioration with the passage of time of the film, and a correction value for offsetting this deterioration amount is obtained, to be applied to all the prints of the next day (the day). On and after the next day also, by the repetition of the same operation, a correction of the film deterioration with the passage of time with a good accuracy is possible.

Generally speaking, in most cases, the power source of an apparatus is turned off during night hours, and is turned on at the start of operation of the next day; however, a film is subject to the influence of the heat generation of the apparatus in film processing or in the standby state for a short time after the turning-on of the power source, a thermally developable photosensitive film is easy to make a characteristic change but is comparatively difficult to make a characteristic change during the turning-off of the power source; therefore, either after the last diagnosis image was obtained the previous day or during the waiting hour for the start of image processing in the beginning of operation of the day, it is appropriate to calculate an FB (feedback) correction value for the film characteristic deterioration with the passage of time on the basis of stored patch data.

Besides, if the time period of the stopping of the apparatus is shorter than a specified value, the FB correction calculation for the film deterioration with the passage of time is not to be carried out.

Further, if film loading is made several times in a day, at every time of loading, accompanied by a calibration, patch data are cleared to zero, and only the patch data of film sheets of the lastly loaded package are to be used in the correction of the next day; however, because a film which is used for a short time in this way is difficult to produce a characteristic deterioration with the passage of time itself, it is unnecessary to store the patch data, and also it is appropriate to practice only the control of the image formation conditions of the apparatus.

By this invention, it is possible to provide an image processing apparatus, and image processing method, and a program capable of, in addition to exhibiting an effect of the second embodiment of this invention, obtaining a stabilized density even in the case where an image formation is practiced by the use of a thermally developable photosensitive film.

(Fifth Embodiment)

An image processing apparatus for practicing an image processing method of this embodiment is different from that of the fourth embodiment in terms of the point that the period of time after loading of film sheets is divided into two, and a different correction (a correction of the exposure section 120 and/or the development section 130) from the other is carried out in each of the two periods.

Figure 19:
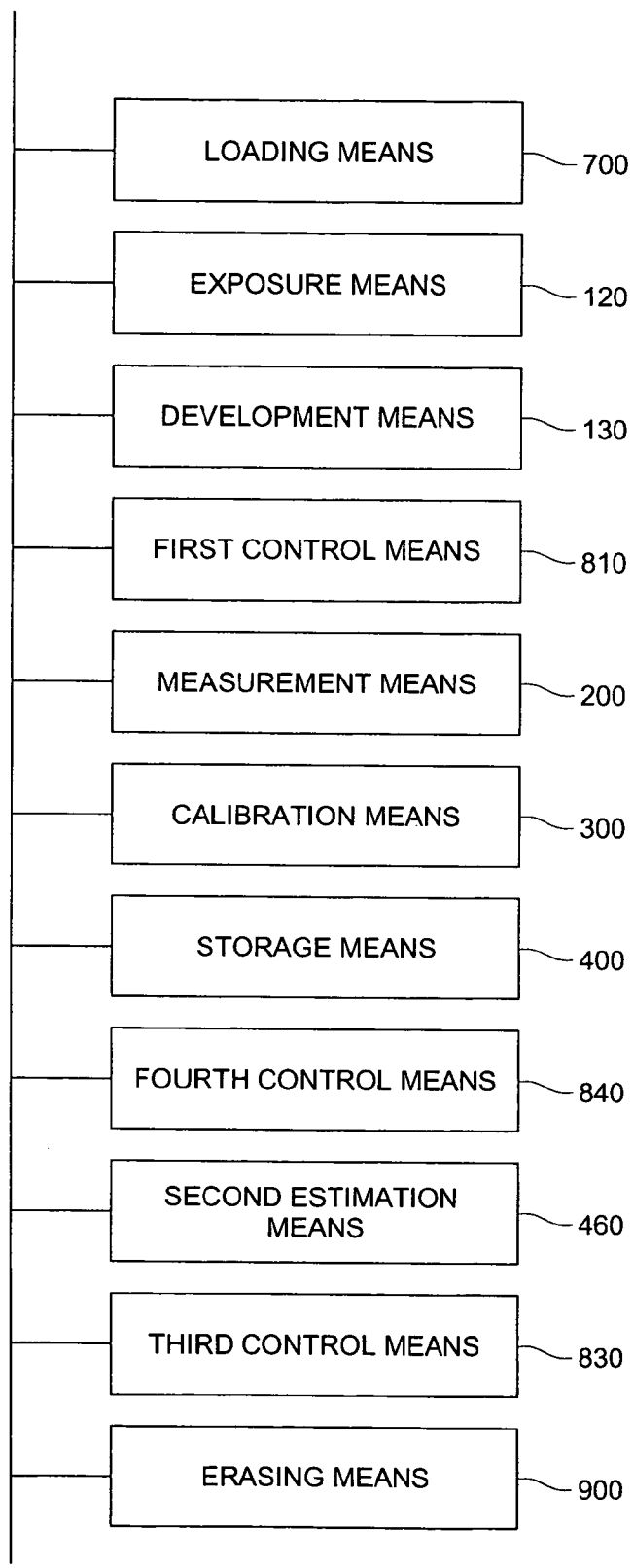
FIG. 19 is a block diagram for illustrating the function of an image processing apparatus of the fifth embodiment for practicing an image processing method of this invention.
Figure 20:
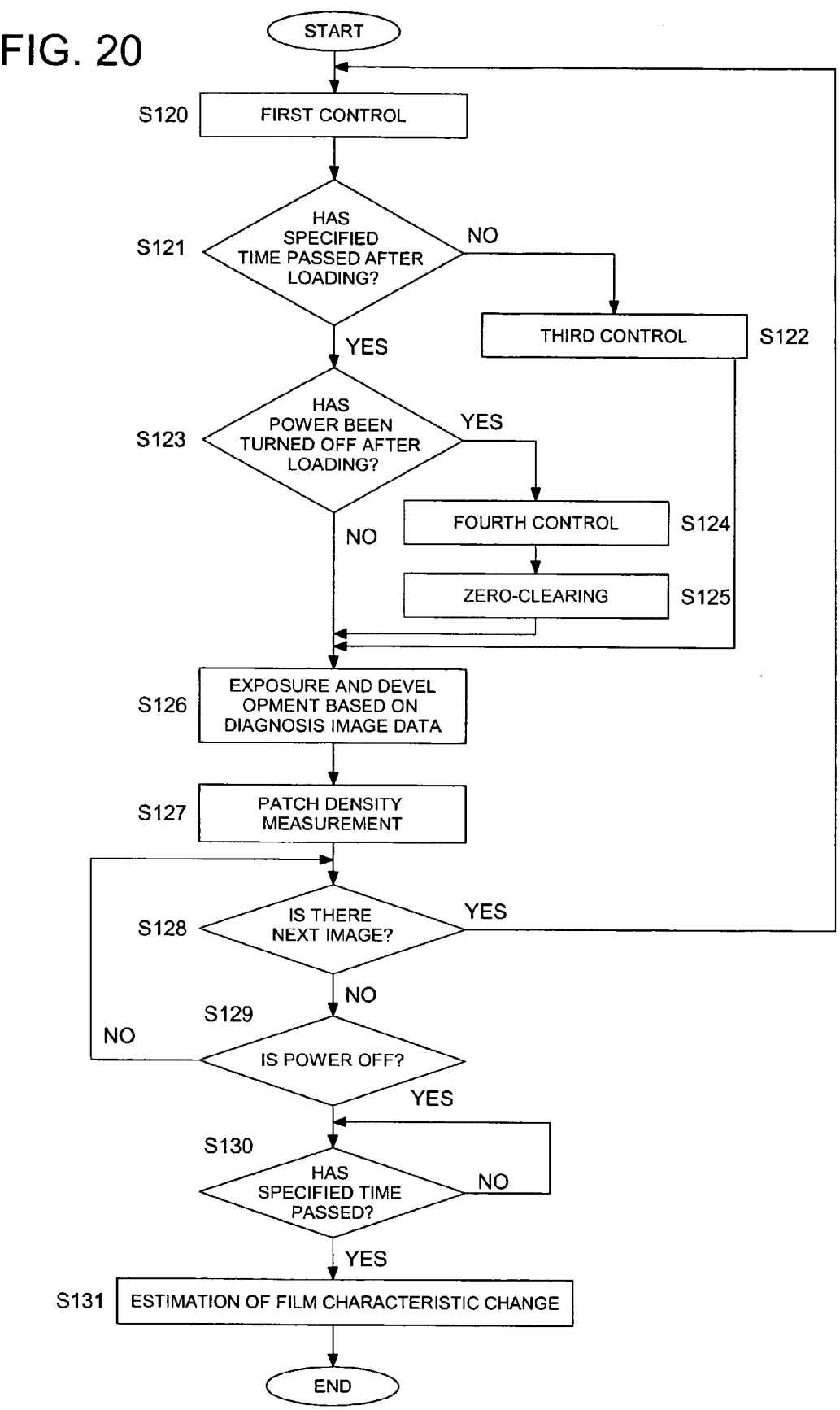
FIG. 20 is a flow chart for explaining the processing at the time of forming a diagnosis image by the image processing apparatus shown in FIG. 19.

FIG. 19 is a block diagram for illustrating the function of the fifth mode of the embodiment of an image processing apparatus for practicing an image processing method of this invention, and FIG. 20 is a flow chart for explaining the processing at the time of forming a diagnosis image by the image processing apparatus shown in FIG. 19.

As shown in FIG. 19, an image processing apparatus of this invention is equipped with a loading means 700 for practicing a loading process, an exposure means 120 for practicing an exposure process, a development means 130 for practicing a development process, a measurement means 200 for practicing a measurement process, a calibration means 300 for practicing a calibration process, a first control means 810 for practicing a first control process, a storage means 400 for practicing a storage process, a second estimation means (device) 460 for practicing a second estimation process, an erasing means 900 (clearing device) for practicing an erasing process, a third control means (controlling device) 830 for practicing a third control process, and a fourth control means (controlling device) 840 for practicing a fourth control process.

In addition, the loading means 700 shown in FIG. 19 is equivalent to the first and second loading units 11 and 12 shown in FIG. 1, and the first control means 810 and the fourth control means 840 shown in FIG. 19 are equivalent to the control section 99 shown in FIG. 2 and the correction means 310 shown in FIG. 2.

(At the Time of Loading Film Sheets)

As regards the processing at the time of loading film sheets, also in this embodiment of the invention, if the first estimation means (device) 450 in the fourth embodiment is substituted by the second estimation means (device) 460 of this embodiment, it can be said that the same processing is carried out; therefore, the explanation will be omitted.

(At the Time of Forming a Diagnosis Image)

In FIG. 20, first, in order to cancel the characteristic change of the apparatus, an adjustment of the exposure system and/or the thermal development system is carried out. In the first control means 810, a control of the exposure means 120 and/or the development means 130 is carried out (S120). To state it concretely, for example, the cooling-conveyance section and/or the exposure means is controlled in accordance with the result of the temperature monitoring by means of a temperature sensor in the apparatus to change the image formation conditions of the apparatus so as to make the image formation conditions approximately constant.

After the film loading, whether or not a specified time has passed is judged in the third control means 830 (S121), and if the specified time has not passed, on the basis of the difference between the result of the density measurement of a specified area of a diagnosis image to be described later and a predetermined density value for comparison, a control of the exposure means 120 and/or the development means 130 is carried out in the third control means 830 (S122).

If the specified time is judged to have passed in the step 121, whether or not the power source has been turned off after the film loading was carried out is judged in the fourth control means 840 (S123), and if the power source has been turned off, in the fourth control means 840, in order to offset a film characteristic change estimated in the second estimation means (device) 460 to be described later, a control of the exposure means 120 and/or the development means 130 is carried out (S124). After the control to offset the film characteristic change is carried out in the fourth control means 840 on the basis of the film characteristic change, the film characteristic change kept in the second estimation means 460 is cleared to zero (S125). As regards the steps S124 and S125, because the film characteristic change of the second estimation means 460 is cleared to zero in the step S125 after the control by the fourth control means 840 is carried out, if the control is once made in the fourth control means 840, a control to substantially offset the film characteristic change is not carried out doubly.

After that, an exposure and a development based on image data for diagnosis are carried out in the exposure means 120 and the development means 130 (S126). At this time, a patch image is formed as well as a diagnosis image. A patch image can be obtained by it that when an image formation is made on the basis of diagnosis image data, a part of a film sheet on which said diagnosis image is formed is exposed by a predetermined exposure light quantity or a light quantity corresponding to a density designated through an LUT. A part of a film sheet on which a diagnosis image is formed is an area as indicated by F1 located at the edge portion of a film sheet F of FIG. 8 outside the image formation area F2, and for example, an area of about 5 mm×10 mm is used.

The density of the patch which has been exposed and developed by the exposure means 120 and the development means 130 is measured (S127). The result of the density measurement of a part of the film sheet exposed and developed in the step S126 is stored and saved in the storage means 400 as patch data. Patch data during a specified period of time after the film loading are used in a control in the third control means 830, and patch data after that are become the basis of the calculation of a film characteristic change in the second estimation means 460.

Whether or not there are diagnosis image data to become the object of processing next is judged (S128); if there are next diagnosis image data, the procedure returns to S120, and if there is no image data, the apparatus is brought into a ready state with the power source turned off (S129).

If the power source is turned off in the step S129, whether or not the apparatus has been stopped for a specified period of time (S130), and if the apparatus is judged to have been stopped for a specified period of time, on the basis of the patch data stored and saved in the storage means 400, a film characteristic change is calculated and kept (S131). A film characteristic change is calculated in the following way. That is, by the use of the patch density a of the last print at the time of a sudden change and the patch density b at the time of a comparatively slow change, the average value of |b−a| (the absolute value of (b−a)) is calculated, and this is multiplied by a suitable factor (gain), to determine a film characteristic change. In this way, the second estimation means 460 calculates and keeps a film characteristic change every time the apparatus has been stopped for a specified period of time.

Figure 21:
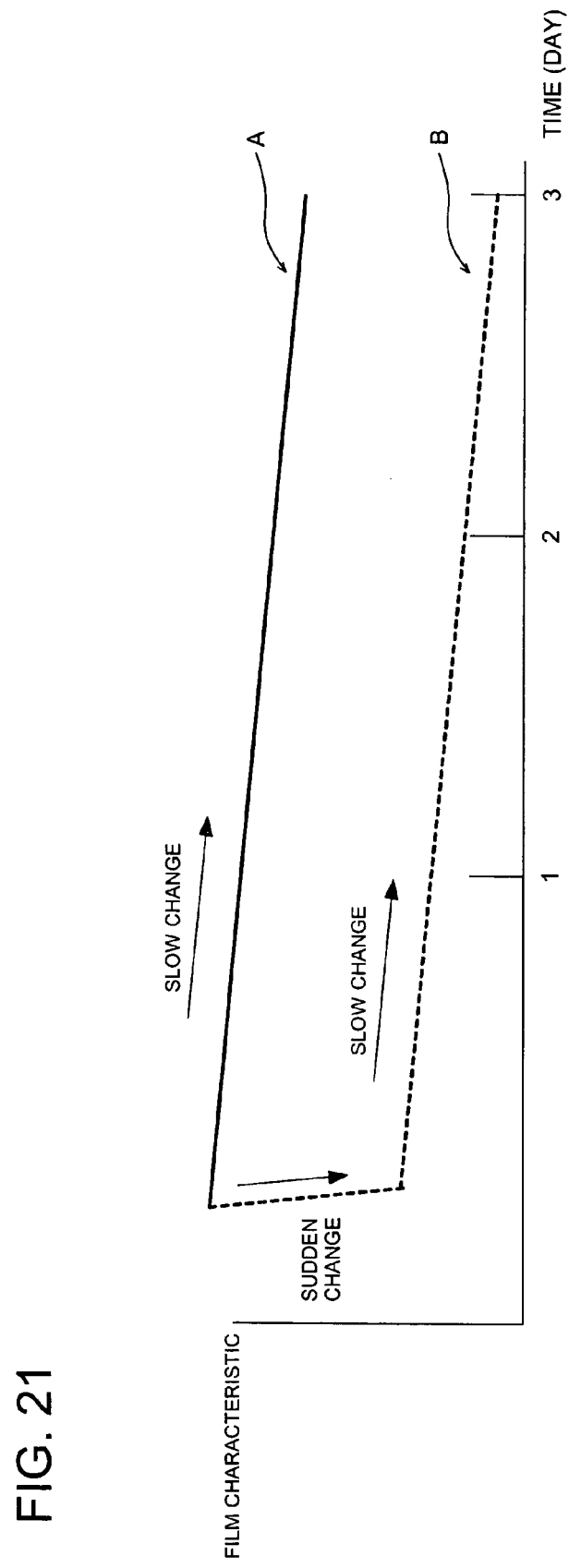
FIG. 21 is a drawing showing how a film characteristic changes.
Figure 22:
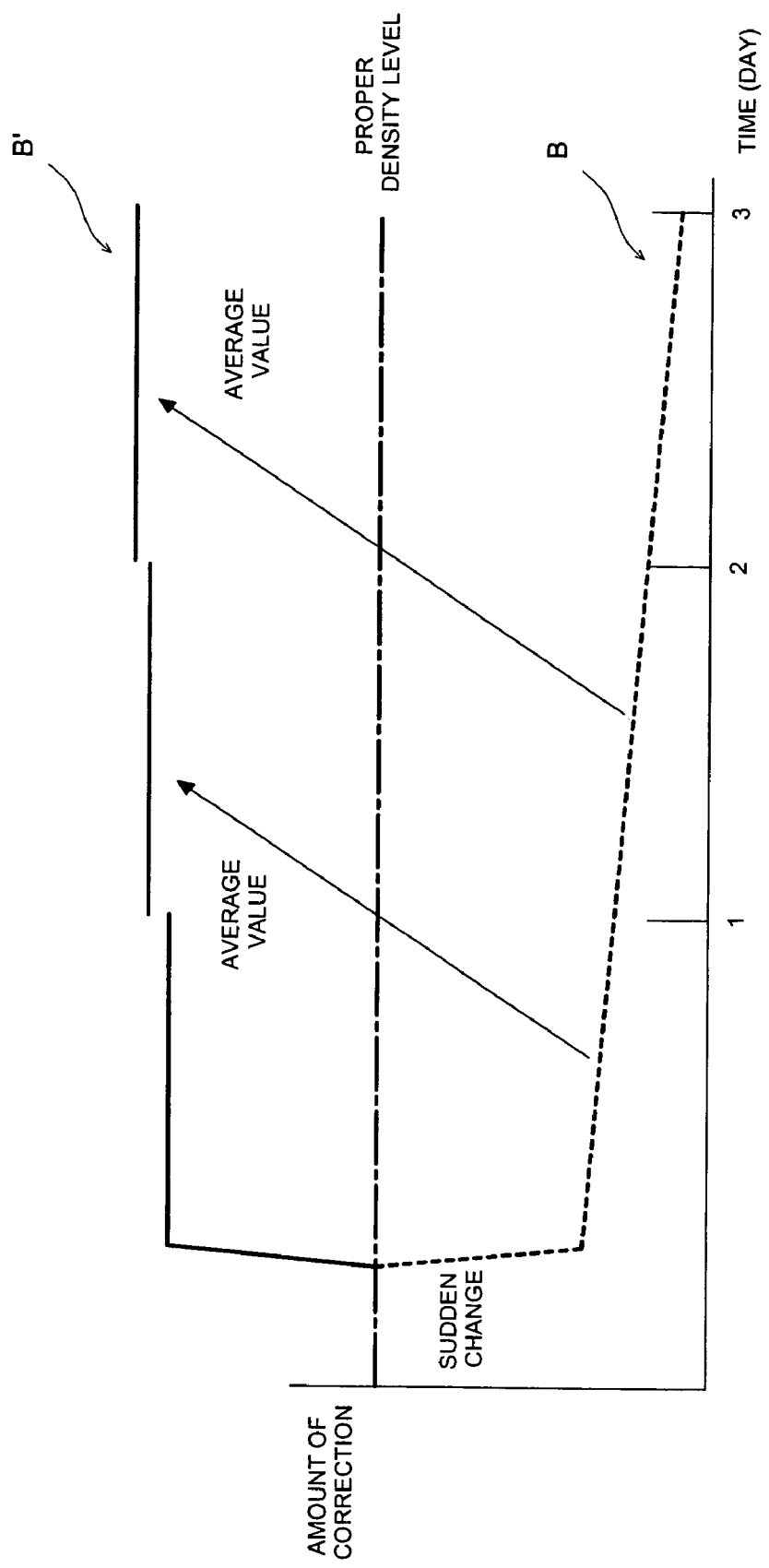
FIG. 22 is a drawing showing how a control is carried out in the fourth control means and the third control means.

FIG. 21 is a drawing showing how a film characteristic changes. FIG. 22 is a drawing showing how a control is carried out in the fourth control means 840 and the third control means 830.

In FIG. 21, the line A shows how a film characteristic changes slowly after the loading of it, and the line B shows the manner of film characteristic change adopted in the fifth mode of the image processing method.

In FIG. 22, the line B' shows the amount of control (amount of correction) in the case where the film characteristic change of FIG. 21 is shown by the line B. In this way, in an image processing method of this invention, in the first sudden characteristic change, a rapid control by the third control means 830 is carried out, and during the comparative slow change after that, a control based on the second estimation means is carried out in the fourth control means 840.

By this invention, it is possible to provide an image processing apparatus, an image processing method, and a program capable of, in addition to exhibiting the effect of the second embodiment and the fourth embodiment of the invention, obtaining a stabilized density even in the case where it is used a film which is a thermally developable photosensitive film deteriorating with the passage of time and produces a sudden film characteristic change after the film loading as shown by the line B of FIG. 21.

What is claimed is:

1. An image processing apparatus, comprising:
   an exposing device for exposing a thermally developable image forming material so as to form a latent image on the image forming material based on image data;
   a thermal developing device for thermally developing and visualizing the latent image on the exposed image forming material so as to form an image;
   a measuring device for measuring an image density of the image on the developed image forming material;
   a calibrating device for forming a table to define a relation between an image signal and image density thereof based on a plurality of different test image data and measured image densities thereof;
   a storing device for storing characteristic change model data indicating a characteristic change of the thermal developing device over time after starting of operation of the image processing apparatus;
   a difference calculating device to calculate, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the characteristic change model data; and
   a correcting device for correcting the table based on the density difference calculated by the difference calculating device.

2. The image processing apparatus of claim 1, wherein said characteristic change model data indicates the characteristic change starting from a time at which a power source of the image processing apparatus is turned on.

3. The image processing apparatus of claim 1, wherein the characteristic change model data comprises predetermined characteristic change model data installed from outside the image processing apparatus.

4. The image processing apparatus of claim 1, wherein the characteristic change model data comprises actual characteristic change model data obtained based on image densities measured by the measuring device each time any said image forming material is processed.

5. An image processing apparatus, comprising:
   an exposing device for exposing a thermally developable image forming material so as to form a latent image on the image forming material based on image data;
   a thermal developing device for thermally developing and visualizing the latent image on the exposed image forming material so as to form an image;
   a measuring device for measuring an image density of the image on the developed image forming material;
   a calibrating device for forming a table to define a relation between an image signal and an image density thereof based on a plurality of different test image data and measured image densities thereof;
   a storing device for storing passage-time film characteristic model data indicating a change over time of a characteristic of the image forming material after loading of the image forming material in the image processing apparatus and for storing result data obtained by exposing a part of the image forming material with a light quantity that corresponds to a predetermined density according to the table at a time of forming a diagnosis image and by measuring a density at said part of the image forming material;
   a difference calculating device to calculate, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the passage-time film characteristic model data;
   a correcting device for correcting the table based on the density difference calculated by the difference calculating device;
   a first controlling device for controlling at least one of the exposing device and the developing device so as to offset a characteristic change of at least one of the exposing device and the developing device;
   a first estimation device for calculating and keeping a characteristic change of the image forming material based on the stored result data; and
   a second controlling device for controlling a least one of the exposing device and the developing device based on the characteristic change of the image forming material calculated by the first estimation device instead of the stored passage-time film characteristic model data so as to offset the characteristic change of the image forming material.

6. The image processing apparatus of claim 5, further comprising:
   a clearing device for clearing the characteristic change calculated by the first estimation device when the table is prepared by the calibrating device and when the second controlling device is operated.

7. The image processing apparatus of claim 5, wherein the first controlling device and the second controlling device are operated when an image formation operation is resumed after the image processing apparatus has been stopped for a period of time that is not shorter than a predetermined time.

8. The image processing apparatus of claim 5, wherein said first estimation device calculates and keeps a characteristic change of the image forming material every time the image processing apparatus stops for a predetermined period of time.

9. An image processing apparatus, comprising:
an exposing device for exposing a thermally developable image forming material so as to form a latent image on the image forming material based on image data;
a thermal developing device for thermally developing and visualizing the latent image on the exposed image forming material so as to form an image;
a measuring device for measuring an image density of the image on the developed image forming material;
a calibrating device for forming a table to define a relation between an image signal and an image density thereof based on a plurality of different test image data and measured image densities thereof;
a first storing device for storing characteristic change model data indicating changes over time of a characteristic of the thermal developing device after starting of operation of the image processing apparatus;
a second storing device for storing passage-time film characteristic model data indicating a change over time of a characteristic of the image forming material after loading of the image forming material in the image processing apparatus; and
a difference calculating device to calculate, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the characteristic change model data and the passage-time film characteristic model data; and
a correcting device for correcting the table based on the density difference calculated by the difference calculating device.

10. The image processing apparatus of claim 9, wherein said characteristic change model data indicates the characteristic change starting from a point of time at which a power source of the image processing apparatus is turned on.

11. A method of image processing with an image processing apparatus, comprising:
exposing a thermally developable image forming material so as to form a latent image on the image forming material based on image data;
thermally developing and visualizing, with a thermal developing device, the latent image on the exposed image forming material so as to form an image;
measuring an image density of the image on the developed image forming material;
forming a table to define a relation between an image signal and image density thereof based on a plurality of different test image data and measured image densities thereof;
storing characteristic change model data indicating a characteristic change of the thermal developing device over time after starting of operation of the image processing apparatus;
calculating, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the characteristic change model data; and
correcting the table based on the calculated density difference.

12. The method of claim 11, wherein the characteristic change model data indicates the characteristic change starting from a time at which a power source of the image processing apparatus is turned on.

13. The method of claim 11, wherein said characteristic change model data comprises predetermined characteristic change model data installed from outside the image processing apparatus.

14. The method of claim 11, wherein said characteristic change model data comprises actual characteristic change model data obtained based on image densities measured by the measuring device each time any said image forming material is processed.

15. A method of image processing with an image processing apparatus, comprising:
exposing, with an exposing device, a thermally developable image forming material so as to form a latent image on the image forming material based on image data;
thermally developing and visualizing, with a thermal developing device, the latent image on the exposed image forming material so as to form an image;
measuring an image density of the image on the developed image forming material;
forming a table to define a relation between an image signal and an image density thereof based on a plurality of different test image data and measured image densities thereof;
storing passage-time film characteristic model data indicating a change over time of a characteristic of the image forming material after loading of the image forming material in the image processing apparatus;
calculating, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the passage-time film characteristic model data;
correcting the table based on the calculated density difference;
storing result data obtained by exposing a part of the image forming material with a light quantity that corresponds to a predetermined density according to the table at a time of forming a diagnosis image and by measuring a density at said part of the image forming material;
controlling at least one of the exposing device and the developing device so as to offset a characteristic change of at least one of the exposing device and the developing device;
calculating and keeping a characteristic change of the image forming material based on the stored result data; and
controlling at least one of the exposing device and the developing device based on the calculated characteristic change of the image forming material instead of the stored passage-time film characteristic model data so as to offset the characteristic change of the image forming material.

16. The method of claim 15, further comprising:
clearing the calculated characteristic change of the image forming material when the table is prepared and when the at least one of the exposing device and the developing device are controlled based on the calculated characteristic change of the image forming material.

17. The method of claim 15, wherein the controlling steps are carried out when an image processing operation is resumed after the image processing apparatus has been stopped for a period of time that is not shorter than a predetermined time.

18. The method of claim 15, wherein a characteristic change of the image forming material is calculated and kept every time the image processing apparatus stops for a predetermined period of time.

19. A method of image processing with an image processing apparatus, comprising:
exposing a thermally developable image forming material so as to form a latent image on the image forming material based on image data;
thermally developing and visualizing, with a thermal developing device, the latent image on the exposed image forming material so as to form an image;
measuring an image density of the image on the developed image forming material;
forming a table to define a relation between an image signal and an image density thereof based on a plurality of different test image data and measured image densities thereof;
storing characteristic change model data indicating changes over time of a characteristic of a thermal developing device after starting of operation of the image processing apparatus;
storing passage-time film characteristic model data indicating a change over time of a characteristic of the image forming material after loading of the image forming material in the image processing apparatus; and
calculating, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the characteristic change model data and the passage-time film characteristic model data; and
correcting the table based on the calculated density difference.

20. The method of claim 19, wherein the characteristic change model data indicates the characteristic change starting from a time at which a power source of the image processing apparatus is turned on.

21. A computer-readable recording medium having a computer program stored thereon to be executed by a computer to cause the computer to control an image processor to execute functions comprising:
an exposing function for exposing a thermally developable image forming material so as to form a latent image on the image forming material based on image data;
a thermal developing function for thermally developing and visualizing, with a thermal developing device, the latent image on the exposed image forming material so as to form an image;
a measuring function for measuring an image density of the image on the developed image forming material;
a calibrating function for forming a table to define a relation between an image signal and image density thereof based on a plurality of different test image data and measured image densities thereof;
a storing function for storing characteristic change model data indicating a characteristic change of the thermal developing device over time after starting of operation of the image processor;
a difference calculating function to calculate, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the characteristic change model data; and
a correcting function for correcting the table based on the density difference calculated by the difference calculating function.

22. The computer-readable recording medium of claim 21, wherein the characteristic change model data indicates the characteristic change starting from a time at which a power source of the image processor is turned on.

23. The computer-readable recording medium of claim 21, wherein said characteristic change model data comprises predetermined characteristic change model data installed from outside the image processor.

24. The computer-readable recording medium of claim 21, wherein said characteristic change model data comprises actual characteristic change model data obtained based on image densities measured by the measuring function each time any said image forming material is processed.

25. A computer-readable recording medium having a computer program stored thereon to be executed by a computer to cause the computer to control an image processor to execute functions comprising:
an exposing function, with an exposing device, for exposing a thermally developable image forming material so as to form a latent image on the image forming material based on image data;
a developing function for thermally developing and visualizing, with a thermal developing device, the latent image on the exposed image forming material so as to form an image;
a measuring function for measuring an image density of the image on the developed image forming material;
a calibrating function for forming a table to define a relation between an image signal and an image density thereof based on a plurality of different test image data and measured image densities thereof;
a storing function for storing passage-time film characteristic model data indicating a change over time of a characteristic of the image forming material after loading of the image forming material in the image processor;
a difference calculating function to calculate, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the passage-time film characteristic model data;

a correcting function for correcting the table based on the density difference calculated by the difference calculating function;

a further storing function for storing result data obtained by exposing a part of the image forming material with a light quantity that corresponds to a predetermined density according to the table at a time of forming a diagnosis image and by measuring a density at said part of the image forming material;

a first controlling function for controlling at least one of the exposing device and the developing device so as to offset a characteristic change of at least one of the exposing device and the developing device;

a first estimating function for calculating and keeping a characteristic change of the image forming material based on the stored result data; and a second controlling function for controlling at least one of the exposing device and the developing device based on the calculated characteristic change of the image forming material instead of the stored passage-time film characteristic model data so as to offset the characteristic change of the image forming material.

26. The computer-readable recording medium of claim 25, wherein the image processor is controlled to perform further functions comprising:

a clearing function for clearing the characteristic change calculated by the first estimating function when the table is prepared by the calibrating function and when the second controlling is performed.

27. The computer-readable recording medium of claim 25, wherein the first controlling function and the second controlling function are carried out when an image processing operation is resumed after the image processor has been stopped for a period of time that is not shorter than a predetermined time.

28. The computer-readable recording medium of claim 25, wherein said first estimation function calculates and keeps a characteristic change of the image forming material every time the image processor stops for a predetermined period of time.

29. A computer-readable recording medium having a computer program stored thereon to be executed by a computer to cause the computer to control an image processor to execute functions comprising:

an exposing function for exposing a thermally developable image forming material so as to form a latent image on the image forming material based on image data;

a developing function for developing and visualizing, with a thermal developing device, the latent image on the exposed image forming material so as to form an image;

a measuring function for measuring an image density of the image on the developed image forming material;

a calibrating function for forming a table to define a relation between an image signal and an image density thereof based on a plurality of different test image data and measured image densities thereof;

a first storing function for storing characteristic change model data indicating changes over time of a characteristic of the thermal developing device after starting of operation of the image processor;

a second storing function for storing passage-time film characteristic model data indicating a change over time of a characteristic of the image forming material after loading of the image forming material in the image processor; and a difference calculating function to calculate, each time an image is formed based on an image signal corresponding to diagnostic image data, a density difference between an image density at a time at which the table was formed and an image density at a time at which the image is formed based on the image signal corresponding to the diagnostic image data, said calculation of the density difference being performed based on the characteristic change model data and the passage-time film characteristic model data; and a correcting function for correcting the table based on the density difference calculated by the difference calculating function.

30. The computer-readable recording medium of claim 29, wherein the characteristic change model data indicates the characteristic change starting from a time at which a power source of the image processor is turned on.

31. An image processing apparatus, comprising:

an exposing device for exposing an image forming material so as to form a latent image on the image forming material based on image data;

a developing device for developing and visualizing the latent image on the exposed image forming material so as to form an image;

a measuring device for measuring an image density of the image on the developed image forming material;

a calibrating device for forming a table to define a relation between an image signal and an image density thereof based on a plurality of different test image data and measured image densities thereof;

a storing device for storing passage-time film characteristic model data that indicates a change over time of a characteristic of the image forming material;

a difference calculating device to calculate a density difference, based on the passage-time film characteristic model data, between an image density at a time at which the table was formed and an image density at a time at which an image is formed based on an image signal corresponding to diagnostic image data; and a correcting device for correcting the table based on the density difference calculated by the difference calculating device;

wherein said storing device stores result data obtained by exposing a part of the image forming material with a light quantity that corresponds to a predetermined density according to the table at a time of forming a diagnosis image and by measuring a density on said part of the image forming material; and wherein the image processing apparatus further comprises:

a holder for holding the image forming material;

a first controlling device for controlling at least one of the exposing device and the developing device so as to offset a characteristic change of at least one of the exposing device and the developing device;

a third controlling device for controlling, during a predetermined period of time after loading the holder to the image processing apparatus, at least one of the exposing device and the developing device based on a difference between the density measured at said part of the image forming material and a predetermined density for comparison;

a second estimation device for calculating and keeping a characteristic change of the image forming material based on an amount of the control carried out lastly in said third controlling device and the stored result data; and a fourth controlling device for controlling, if the predetermined period of time after loading the holder to the image processing apparatus has elapsed, at least one of the exposing device and the developing device based on the characteristic change of the image forming material calculated by the second estimation device instead of stored passage-time film characteristic model data in so as to offset the characteristic change of the image forming material.

32. The image processing apparatus of claim 31, further comprising:
a clearing device for clearing the characteristic change calculated by the second estimation device when the table is prepared by the calibrating device and when the fourth controlling device is operated.

33. The image processing apparatus of claim 31, wherein the first controlling device and the fourth controlling device are operated when an image formation operation is resumed after the image processing apparatus has been stopped for a period of time not shorter than a predetermined time.

34. The image processing apparatus of claim 31, wherein said second estimation device calculates and keeps a characteristic change of the image forming material every time the image processing apparatus stops for a predetermined period of time.

35. A method of image processing with an image processing apparatus, comprising:
exposing, with an exposing device, an image forming material so as to form a latent image on the image forming material based on image data;
developing and visualizing, with a developing device, the latent image on the exposed image forming material so as to form an image;
measuring an image density of the image on the developed image forming material;
forming a table to define a relation between an image signal and an image density thereof based on a plurality of different test image data and measured image densities thereof;
storing passage-time film characteristic model data that indicates a change over time of a characteristic of the image forming material;
calculating a density difference, based on the passage-time film characteristic model, between an image density at a time at which the table was formed and an image density at a time at which an image is formed based on an image signal corresponding to diagnostic image data;
correcting the table based on the calculated density difference calculated by the difference calculating;
storing result data obtained by exposing a part of the image forming material with a light quantity that corresponds to a predetermined density according to the table at a time of forming a diagnosis image and by measuring a density at said part of the image forming material;
loading a holder which holds the image forming material to the image processing apparatus;
controlling at least one of the exposing device and the developing device so as to offset a characteristic change of at least one of the exposing device and the developing device;

controlling, during a predetermined period of time after loading the holder to the image processing apparatus, at least one of the exposing device and the developing device based on a difference between the density measured at said part of the image forming material and a predetermined density for comparison;
calculating and keeping a characteristic change of the image forming material based on an amount of the control carried out lastly in the controlling performed based on the measured density and the density for comparison, and the stored result data; and
controlling at least one of the exposing device and the developing device based on the calculated characteristic change of the image forming material, instead of the stored passage-time film characteristic model data so as to offset the characteristic change of the image forming material.

36. The method of claim 35, further comprising:
clearing the characteristic change of the image forming material when the table is prepared and when the at least one of the exposing device and the developing device are controlled based on the calculated characteristic change of the image forming material.

37. The method of claim 35, wherein when an image formation operation is resumed after the image processing apparatus has been stopped for a period of time that is not shorter than a predetermined time, (i) the controlling the at least one of the exposing device and the developing device so as to offset the a characteristic change of at least one of the exposing device and the developing device, and (ii) the controlling the at least one of the exposing device and the developing device based on the calculated characteristic change of the image forming material are both carried out.

38. The method of claim 35, wherein a characteristic change of the image forming material is calculated and kept every time the image processing apparatus stops for a predetermined period of time.

39. A computer-readable recording medium having a computer program stored thereon to be executed by a computer to cause the computer to control an image processor to execute functions comprising:
an exposing function for exposing, with an exposing device, an image forming material so as to form a latent image on the image forming material based on image data;
a developing function for developing and visualizing, with a developing device, the latent image on the exposed image forming material so as to form an image;
a measuring function for measuring an image density of the image on the developed image forming material;
a calibrating function for forming a table to define a relation between an image signal and an image density thereof based on a plurality of different test image data and measured image densities thereof;
a storing function for storing passage-time film characteristic model data that indicates a change over time of a characteristic of the image forming material; and
a difference calculating function to calculate a density difference, based on the passage-time film characteristic model data, between an image density at a time at which the table was formed and an image density at a time at which an image is formed based on image signal corresponding to diagnostic image data; and
a correcting function for correcting the table based on the density difference calculated by the difference calculating function;

a further storing function for storing result data obtained by exposing a part of the image forming material with a light quantity that corresponds to a predetermined density according to the table at a time of forming a diagnosis image and by measuring a density on said part of the image forming material;

a loading function for loading for a holder which holds the image forming material to the image processor;

a first controlling function for controlling at least one of the exposing device and the developing device so as to offset a characteristic change of at least one of the exposing device and the developing device;

a third controlling function for controlling, during a predetermined period of time after loading the holder to the image processor, at least one of the exposing device and the developing device based on a difference between the density measured at said part of the image forming material and a predetermined density for comparison;

a second estimating function for calculating and keeping a characteristic change of the image forming material based on an amount of the control carried out lastly in the third controlling function of and the stored result data; and a fourth controlling function for controlling, if the predetermined period of time after loading the holder to the image processor has elapsed, at least one of the exposing device and the developing device based on the characteristic change calculated in the second estimating function instead of the stored passage-time film characteristic model data so as to offset the characteristic change of the image forming material.

40. The computer-readable recording medium of claim 39, wherein the image processor is controlled to perform further functions comprising:

a clearing function for clearing the characteristic change calculated by the second estimating function when the table is prepared by the calibrating function and when the fourth controlling is performed.

41. The computer-readable recording medium of claim 39, wherein the first controlling function and the fourth controlling function are carried out when an image formation operation is resumed after the the image processor has been stopped for a period of time not shorter than a predetermined time.

42. The computer-readable recording medium of claim 39, wherein said second estimation function calculates and keeps a characteristic change of the image forming material every time the image processor stops for a predetermined period of time.

* * * * *